United States Patent
Takahashi et al.

(10) Patent No.: US 10,414,851 B2
(45) Date of Patent: Sep. 17, 2019

(54) RUBBER MEMBER FOR DOWNHOLE TOOLS, DOWNHOLE TOOL, AND METHOD FOR RECOVERING HYDROCARBON RESOURCE

(71) Applicant: Kureha Corporation, Tokyo (JP)

(72) Inventors: Takeo Takahashi, Tokyo (JP); Masayuki Okura, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 0 days.

(21) Appl. No.: 14/979,844

(22) Filed: Dec. 28, 2015

(65) Prior Publication Data

US 2016/0108165 A1 Apr. 21, 2016

Related U.S. Application Data

(63) Continuation of application No. PCT/JP2014/066644, filed on Jun. 24, 2014.

(30) Foreign Application Priority Data

Jun. 28, 2013 (JP) .................. 2013-137134
Dec. 19, 2013 (JP) .................. 2013-262504
May 8, 2014 (JP) .................. 2014-096464

(51) Int. Cl.
*E21B 33/12* (2006.01)
*C08G 18/32* (2006.01)
(Continued)

(52) U.S. Cl.
CPC .......... *C08G 18/3221* (2013.01); *C08L 33/08* (2013.01); *C08L 33/20* (2013.01);
(Continued)

(58) Field of Classification Search
CPC .......... E21B 33/12; E21B 43/26; E21B 33/16; E21B 33/134; E21B 33/1285;
(Continued)

(56) References Cited

U.S. PATENT DOCUMENTS 3,251,427 A 5/1966 Ewing et al.
4,784,226 A * 11/1988 Wyatt .................. E21B 23/06
166/182
(Continued)

FOREIGN PATENT DOCUMENTS

CA 2931282 A1 7/2015
CA 2931349 A1 7/2015
(Continued)

OTHER PUBLICATIONS

English translation of International Preliminary Report on Patentability and Written Opinion dated Jan. 7, 2016, in PCT International Application No. PCT/JP2014/066644.
(Continued)

*Primary Examiner* — Yong-Suk Ro
(74) *Attorney, Agent, or Firm* — Birch, Stewart, Kolasch & Birch, LLP

(57) ABSTRACT

Provided is a rubber member for downhole tools, of which a decrease rate of 50% strain compressive stress after immersion for 24 hours in 150° C. water relative to 50% strain compressive stress before immersion is not less than 5%, and preferably not less than 50%. The rubber member is suitable for a seal member, ball sealer, ball seat, and a protecting member. Also provided is a downhole tool comprising the rubber member, and a method for recovering a hydrocarbon resource using the downhole tool.

6 Claims, 1 Drawing Sheet

(51) Int. Cl.
*C08L 33/08* (2006.01)
*E21B 43/16* (2006.01)
*C08L 33/20* (2006.01)
*C08L 75/04* (2006.01)
*C08L 101/00* (2006.01)

(52) U.S. Cl.
CPC .............. *C08L 75/04* (2013.01); *C08L 101/00* (2013.01); *E21B 33/12* (2013.01); *E21B 43/16* (2013.01)

(58) Field of Classification Search
CPC ......... C08G 18/3221; C08L 7/00; C08L 9/00; C08L 11/00; C08L 21/00; C08L 23/16; C08L 23/22; C08L 33/08; C08L 33/20; C08L 75/04; C08L 101/00
See application file for complete search history.

(56) References Cited

U.S. PATENT DOCUMENTS

| | | |
|---|---|---|
| 2005/0205266 A1 | 9/2005 | Todd et al. |
| 2006/0157248 A1 | 7/2006 | Hoefer et al. |
| 2007/0277979 A1 | 12/2007 | Todd et al. |
| 2008/0224413 A1 | 9/2008 | Doane et al. |
| 2009/0101334 A1 | 4/2009 | Baser et al. |
| 2009/0242214 A1 | 10/2009 | Foster et al. |
| 2010/0004146 A1 | 1/2010 | Panga et al. |
| 2010/0132959 A1 | 6/2010 | Tinker |
| 2011/0067889 A1 | 3/2011 | Marya et al. |
| 2011/0067899 A1 | 3/2011 | Choi et al. |
| 2011/0277989 A1 | 11/2011 | Frazier |
| 2012/0208934 A1 | 8/2012 | Korte et al. |
| 2013/0062062 A1 | 3/2013 | Petty et al. |
| 2013/0292123 A1 | 11/2013 | Murphree et al. |
| 2014/0039084 A1* | 2/2014 | Minagawa ................ C08F 8/00 522/46 |
| 2014/0190685 A1 | 7/2014 | Frazier et al. |
| 2014/0246209 A1* | 9/2014 | Themig ................... E21B 43/14 166/374 |
| 2015/0096741 A1 | 4/2015 | Okura et al. |
| 2016/0108696 A1 | 4/2016 | Okura et al. |

FOREIGN PATENT DOCUMENTS

| | | | |
|---|---|---|---|
| CA | 2931498 A1 | 7/2015 | |
| CA | 2907934 C | 11/2016 | |
| CN | 202300266 U | 7/2012 | |
| CN | 103089185 A | 5/2013 | |
| JP | 4-179792 A | 6/1992 | |
| JP | 3583601 B2 | 11/2004 | |
| JP | 2011256221 A | 12/2011 | |
| JP | 2013014699 A | 1/2013 | |
| JP | WO2013/183363 A1 | 12/2013 | |
| WO | WO 2010/039131 A1 | 4/2010 | |
| WO | WO 2013/053057 A1 | 4/2013 | |
| WO | WO 2014/193697 A1 | 12/2014 | |
| WO | WO 2015/098801 A1 | 7/2015 | |
| WO | WO 2015/098849 A1 | 7/2015 | |
| WO | WO 2015/098913 A1 | 7/2015 | |
| WO | WO 2015/133544 A1 | 9/2015 | |
| WO | WO 2015/133545 A1 | 9/2015 | |

OTHER PUBLICATIONS

Extended European Search Report for European Application No. 14816880.0, dated Sep. 28, 2016.
International Search Report of PCT/JP2014/066644 dated Sep. 30, 2014.
Canadian Office Action, dated Oct. 6, 2016, for corresponding Canadian Application No. 2,916,373.
Notification of the First Office Action dated May 16, 2016, in Chinese Patent Application No. 201480024909.9, with English translation.
Chinese Office Action and Search Report with English translation thereof for Chinese Application No. 201480024909.9, dated Dec. 28, 2016.
International Preliminary Report on Patentability and English Translation of the Written Opinion of the Searching Authority (Forms PCT/IB/338, PCT/IB/373 and PCT/ISA/237), dated Jul. 7, 2016, in PCT International Application No. PCT/JP2014/084231.
International Search Report (Form PCT/ISA/210), dated Mar. 31, 2015, for International Application No. PCT/JP2014/084231.
Office Action and Search Report issued in the corresponding Canadian Patent Application No. 2,931,352 dated Mar. 24, 2017.
European Office Action, dated Mar. 22, 2017, for European Application No. 14816880.0.
Canadian Office Action and Search Report, dated Jul. 25, 2017, for Canadian Application No. 2,916,373.
U.S. Office Action, dated Dec. 26, 2017, for U.S. Appl. No. 15/037,352.
Japanese Notice of Reasons for Rejection for Japanese Application No. 2014-096464, dated Dec. 12, 2017, with English translation.
U.S. Office Action, dated Jul. 27, 2018, for U.S. Appl. No. 15/037,352.
Advisory Action issued in U.S. Appl. No. 15/037,352 dated Oct. 3, 2018.
Japanese Notification of Reasons for Refusal (including an English translation thereof) issued in Japanese Patent Application No. 2014-232444 dated Sep. 4, 2018.
U.S. Office Action, dated Oct. 30, 2018, for U.S. Appl. No. 15/037,352.
Mexican Office Action (including an English translation thereof) issued in the Mexican Patent Applicant No. MX/a/2015/016184 dated Jul. 27, 2018.
U.S. Office Action, dated Apr. 25, 2019, for U.S. Appl. No. 15/037,352.
Canadian Office Action, dated Apr. 3, 2018, for Candian Application No. 2,916,373.

\* cited by examiner

RUBBER MEMBER FOR DOWNHOLE TOOLS, DOWNHOLE TOOL, AND METHOD FOR RECOVERING HYDROCARBON RESOURCE

CROSS-REFERENCE TO RELATED APPLICATIONS

This is a continuation of international application PCT/JP2014/066644, with an international filing date of Jun. 24, 2014, filed by applicant, the disclosure of which is hereby incorporated by reference in its entirety.

TECHNICAL FIELD

The present invention relates to a rubber member for downhole tools for producing a hydrocarbon resource such as petroleum or natural gas and recovering a hydrocarbon resource, a downhole tool, and a method for recovering a hydrocarbon resource.

BACKGROUND ART

Hydrocarbon resources such as petroleum or natural gas have come to be produced by excavation through wells (oil wells or gas wells, also collectively called "wells") having a porous and permeable subterranean formation. As energy consumption increases, deeper wells are being drilled, reaching depths greater than 9000 m worldwide and greater than 6000 m in Japan. In wells that are continuously excavated, the productive layer is stimulated in order to continuously excavate hydrocarbon resources efficiently from subterranean formations of which permeability has decreased over time and subterranean formations of which permeability has gradually become insufficient. Acid treatment and hydraulic fracturing are known as stimulation methods (Patent Document 1). Acid treatment is a method in which the permeability of the productive layer is increased by injecting an acid such as hydrochloric acid or hydrofluoric acid into the productive layer and dissolving the reaction components of bedrock (carbonates, clay minerals, silicates, and the like). However, various problems that accompany the use of strong acids have been identified, and increased costs, including various countermeasures, have also been pointed out. Thus, perforation for forming pores and hydraulic fracturing for forming fractures in the productive layer using fluid pressure have received attention.

Hydraulic fracturing is a method in which perforations or fractures are generated in the productive layer by fluid pressure such as water pressure (also simply called "hydraulic pressure" hereinafter). Generally, a vertical hole is drilled, and then the vertical hole is curved and a horizontal hole is drilled in a subterranean formation several thousand meters underground. Fracturing fluid is then fed into these boreholes (meaning holes provided for forming a well, also called "downholes") at high pressure, and fractures and the like are produced by the hydraulic pressure in the deep subterranean productive layer (layer that produces the hydrocarbon resource such as petroleum or natural gas), and the productive layer is thereby stimulated in order to extract and recover the hydrocarbon resource through the fractures and the like. The efficacy of hydraulic fracturing has also been examined for the development of unconventional resources such as shale oil (oil that matures in shale) and shale gas.

Fractures and the like formed by fluid pressure such as water pressure immediately close due to formation pressure when the hydraulic pressure is no longer applied. To prevent a fracture closure, a proppant is included in the fracturing fluid (that is, the well treatment fluid used in fracturing), which is fed into the borehole at high pressure, thereby distributing the proppant in the fracture. Inorganic or organic materials are used as proppants included in fracturing fluid, but silica, alumina, and other inorganic particles have been conventionally used, and sand particles such as 20/40-mesh have been widely used because they are capable of preventing fracture closure in a very deep subterranean environment under high-temperature and high-pressure for a long time.

Various types of water-based, oil-based, and emulsion-based fluids are used as injection well treatment fluids which are fed in at high pressure, such as fracturing fluid. Because the well treatment fluid must have the function of transporting the proppant to the location where the fracture is generated in the borehole, it generally must have a prescribed viscosity, good proppant dispersibility, ease of after-treatment, and low environmental load. Furthermore, fracturing fluid sometimes contains a channelant in order to form flow paths through which shale oil, shale gas, and the like can pass among the proppant. Accordingly, in addition to the proppant, various additives are used in well treatment fluid, such as channelants, gelling agents, antiscale agents, acids for dissolving rock and the like, friction-reducing agents, and the like.

The following method is typically used to produce fractures and perforations by hydraulic pressure in the productive layer of a deep subterranean formation (layer that produces the hydrocarbon resource such a petroleum such as shale oil or natural gas such as shale gas) using fluid fed in at high pressure. Specifically, a prescribed section of a borehole (downhole) drilled and completed in a subterranean formation several thousand meters deep is partially isolated while isolating sequentially from the tip portion of the borehole, and fluid is fed in at high pressure into the isolated section to produce fractures and perforations in the productive layer. Then, the next prescribed section (typically ahead of the preceding section, i.e., a segment closer to the ground surface) is plugged to produce fractures and perforations. After that, this process is repeated until the required isolation and formation of fractures and perforations have been completed.

Stimulation of the productive layer is sometimes also performed again not only for drilling of new wells but for desired sections of boreholes that have already been formed. In this case as well, the operations of borehole isolating, fracturing, and the like are similarly repeated. Additionally, there are also cases where, to perform finishing of the well, the borehole is plugged to isolate fluid from below, and after finishing of the top portions thereof is performed, the isolating is released.

Various methods are known for isolating and fracturing of boreholes, and Patent Documents 2 to 4 disclose plugs that can isolate or fix a borehole (also called a "frac plug," "bridge plug," "packer," or the like). For example, Patent Document 2 discloses a downhole plug for well drilling (also simply called "plug" hereinafter), and specifically discloses a plug comprising a mandrel (main body) having a hollow part in the axial direction, a ring or annular member along the axial direction on the outer circumferential surface orthogonal to the axial direction of the mandrel, a first conical member and slip, a malleable element formed from elastomer, rubber, or the like, a second conical member and slip, and an anti-rotation feature. Isolation of the borehole by a downhole plug for well drilling is performed as follows. Specifically, by moving the mandrel in the axial direction thereof, as the gap between the ring or annular member and the anti-rotation feature gets smaller, the slip contacts the slanted face of the conical member, and by proceeding along the conical member, it expands radially in the outward direction, contacts the inside wall of the borehole, and is fixed in the borehole to seal the borehole, and also, the malleable element deforms by diametric expansion, contacts the inside wall of the borehole, and seals the borehole. The mandrel has a hollow part in the axial direction, and the borehole can be sealed by setting a ball or the like therein.

Patent Document 5 discloses a sleeve system (sometimes called a "frac sleeve") in which a prescribed number of fracture sleeve pistons (sometimes called "pistons" or "piston plugs"), provided by piercing a passageway through the center part inside a sleeve, are arrayed sequentially such that they can move in the axial direction of the sleeve, and by selectively sealing desired passageways of the piston, the spaces above and below the piston are isolated to form a blocked isolation zone in the borehole. By pressurizing the isolation zone with air or fluid, locations that were weakened in advance are destroyed, and perforations or fractures are generated in the inside walls of the borehole. Specifically, Patent Document 5 describes that sealing of the passageway is performed by a separately proposed ball sealer (also simply called "ball"), and to seal reliably, a ball valve seat is provided at a location that the ball sealer contacts in the passageway provided in the piston. A ball valve seat is also typically called a "ball seat" or simply a "seat," and it may be the same member as or a different member than the piston body.

Downhole plugs for well drilling are arranged sequentially inside the well until the well is completed, but must be removed at the stage when production of petroleum such as shale oil or natural gas such as shale gas (hereinafter collectively called "petroleum and natural gas" or "petroleum or natural gas") is begun. Because the plug is typically not designed to be retrievable after use and release of isolation, it is removed by destruction or by making it into small fragments by milling, drill out, or another method, but substantial cost and time are required for milling, drill out, and the like. There are also plugs specially designed to be retrievable after use (retrievable plugs), but since plugs are placed deep underground, substantial cost and time are required to retrieve all of them.

Patent Document 2 describes that metal materials (aluminum, steel, stainless steel, and the like), fibers, wood, composite materials, plastics, and the like are widely exemplified as materials that form plugs, and that composite materials containing a reinforcing material such as carbon fibers, especially polymer composite materials of epoxy resin, phenol resin, and the like, are preferred, and that the mandrel is formed from aluminum or a composite material. On the other hand, Patent Document 2 describes that, in addition to the previously described materials, a material that degrades depending on temperature, pressure, pH (acidic, basic), and the like may be used. However, Patent Document 2 does not disclose whether a material containing a biodegradable material is used for a downhole tool or any part thereof.

Patent Document 3 discloses a disposable downhole tool (meaning a downhole plug or the like) or a member thereof containing a biodegradable material that degrades when exposed to the environment inside a well, and as the biodegradable material, discloses a degradable polymer such as an aliphatic polyester such as polylactic acid. Additionally, Patent Document 3 describes a combination of a tubular body member having an axial-direction flow bore, a packer element assembly comprising an upper sealing element, a center sealing element, and a lower sealing element along the axial direction on the outer circumferential surface orthogonal to the axial direction of the tubular body member, a slip, and a mechanical slip body. Furthermore, Patent Document 3 discloses that fluid flow in only one direction is allowed due to the fact that a ball is set in the flow bore of the cylindrical body part.

Patent Document 4 describes a hydraulic regulating mechanism which performs perforation and fracturing in well drilling for hydrocarbon resource recovery such as a downhole tool such as a bridge plug, comprising a metal-based element that degrades when exposed to the conditions of a downhole, and a swellable member that is bonded with the metal-based element and swells when exposed to the conditions of a downhole. Specifically, as the metal-based element, Patent Document 4 describes a slip and a mandrel formed from a reactive metal selected from aluminum, calcium, and magnesium, or lithium, gallium, indium, or an alloy such as zinc. As the swellable material, Patent Document 4 describes a seal formed from styrene-isoprene block copolymer, polyvinyl alcohol, polylactic acid, or the like. As the swellable material, Patent Document 4 discloses ones that swell approximately 50 to 250% when exposed to salt like sodium chloride, and ones that swell through exposure to hydrocarbons.

Furthermore, in the sleeve system (frac sleeve) described in Patent Document 5, a detachable plug is described, wherein the sleeve and piston can be engaged or released by screwing in or out, using a combination of a removal tool and a detent for receiving the removal tool provided on the top portion of the piston plug, instead of the conventional method using drill out or milling to remove the piston (piston plug) at the stage when production is begun.

Due to increased demand for securement of energy resources and environmental protection, particularly as excavation of unconventional resources expands, excavation conditions are becoming increasingly harsh, such as increased depth. Furthermore, diversification of excavation conditions is advancing, such as the diversification of temperature conditions from approximately 60° C. to approximately 200° C. attendant to diversification of depth. Specifically, various properties are required for the downhole materials used in downhole tools such as frac plugs, bridge plugs, packers, and sleeve systems (frac sleeves). These properties include mechanical strength (tensile characteristics and compression characteristics) to allow the material to be transported to a depth of several thousand meters underground; oil-resistance, water-resistance, and heat-resistance such that mechanical strength and the like are maintained when it comes in contact with the hydrocarbon resource to be recovered in the high-temperature and high-humidity environment of a deep subterranean downhole; seal performance such that isolation can be maintained by high hydraulic pressure when isolating a downhole for perforation and fracturing; and the like. Additionally, the characteristic of being easily removable under the environmental conditions of that well (as described previously, there are diverse environments with regard to temperature conditions and other conditions accompanying diversification of depth) at the stage when a well for hydrocarbon resource recovery has been completed has also come to be required. Downhole tools used in well drilling are arranged sequentially inside the well until the well is completed, and well treatment such as fracturing and perforation are carried out using high-pressure fluid. Then, various sensors, flow paths, and the like are arranged as downhole tool members in order that all well treatments can be completed, the seal can be released, and the next well treatment can be executed repeatedly in sequence. For these sensors, flow paths, and the like, when downhole tools are arranged inside a subterranean borehole, protection is performed by a protecting member or a protective coating (these also qualify as downhole tool members) so that breakage or damage does not occur due to friction, due to contact or collision with other members, or due to the high-pressure fluid used in well treatment. For example, a rubber member such a urethane rubber is used. When the sensors or flow paths are to perform their required functions, the protecting member or protective coating must be removed. Therefore, it has also come to be demanded that the protecting member for a downhole tool which protects the sensor, flow paths, and the like has a protective function for the sensors, flow path, and the like, as well as a function of being easily removable or recoverable.

Thus, there has been a demand for a member for a downhole tool that can reliably perform downhole isolation and the operations of well treatment such as fracturing, and, as necessary, can be easily removed and can easily secure a flow path under a diversity of well environment conditions due to the increasing harshness and diversity of excavation conditions such as increasing depth, and that contributes to reduced expense or shortening of processes.

CITATION LIST

Patent Literature(s)

Patent Document 1: Japanese Unexamined Patent Application Publication No. 2003-533619A (corresponding to US Patent Application Publication No. 2003/0060375 specification)

Patent Document 2: US Patent Application Publication No. 2011/0277989 A1 specification Patent Document 3: US Patent Application Publication No. 2005/0205266 A1 specification Patent Document 4: US Patent Application Publication No. 2011/0067889 A1 specification Patent Document 5: US Patent Application Publication No. 2010/0132959 A1 specification

SUMMARY OF INVENTION

Technical Problem

A first aspect of the problem of the present invention is to provide a member for a downhole tool that can reliably perform downhole isolation and the operations of well treatment such as fracturing, and, as necessary, can be easily removed and can easily secure a flow path under a diversity of well environment conditions due to the increasing harshness and diversity of excavation conditions such as increasing depth, and that contributes to reduced expense or shortening of processes. Other aspects of the problem of the present invention are to provide a downhole tool comprising the member, and to provide a method for recovering a hydrocarbon resource using the downhole tool.

Solution to Problem

As a result of diligent research to solve the above problems, the present inventors discovered that the problems can be solved by selecting a rubber material having distinctive mechanical characteristics, and thereby achieved the present invention.

Specifically, the present invention provides: (1) a rubber member for downhole tools, of which a decrease rate of a 50% strain compressive stress after immersion for 24 hours in 150° C. water relative to a 50% strain compressive stress before immersion is not less than 5%.

As specific modes according to the first aspect of the present invention, rubber members for downhole tools of (2) to (16) below are provided.

(2) The rubber member for downhole tools according to (1) above, wherein the decrease rate of the 50% strain compressive stress after immersion for 24 hours in 150° C. water relative to the 50% strain compressive stress before immersion is not less than 20%.

(3) The rubber member for downhole tools according to (1) above, wherein the decrease rate of the 50% strain compressive stress after immersion for 24 hours in 150° C. water relative to the 50% strain compressive stress before immersion is not less than 50%.

(4) The rubber member for downhole tools according to any one of (1) to (3) above, wherein an increase rate of a volume after immersion for 6 hours in 150° C. water relative to a volume before immersion is less than 20%.

(5) The rubber member for downhole tools according to any one of (1) to (3) above, wherein the volume after immersion for 6 hours in 150° C. water decreases relative to the volume before immersion.

(6) The rubber member for downhole tools according to any one of (1) to (5) above, wherein a loss rate of mass after immersion for 72 hours in 150° C. water relative to a mass before immersion is from 5% to 100%.

(7) A rubber member for downhole tools, of which a loss rate of mass after immersion for 72 hours in 150° C. water relative to a mass before immersion is from 5% to 100%.

(8) The rubber member for downhole tools according to any one of (1) to (7) above, wherein a tensile fracture strain at 66° C. is not less than 50%, a 70% strain compressive stress is not less than 10 MPa, and a compressive fracture strain is not less than 50%.

(9) The rubber member for downhole tools according to (8) above, wherein a surface hardness is in the range of A60 to D80.

(10) The rubber member for downhole tools according to any one of (1) to (9) above, wherein the member is stable in dry environment conditions, and the decrease rate of the 50% strain compressive stress after immersion for 6 hours in 23° C. water relative to the 50% strain compressive stress after immersion for 1 hour is less than 5%.

(11) The rubber member for downhole tools according to any one of (1) to (10) above, wherein a ratio of compressive stress at 70% compressive strain at 66° C. relative to a compressive stress at 5% compressive strain at 66° C. is not less than 5.

(12) The rubber member for downhole tools according to any one of (1) to (11) above, wherein the member contains at least one selected from the group consisting of urethane rubber, natural rubber, polyisoprene, ethylene propylene rubber, butyl rubber, styrene rubber, acrylic rubber, aliphatic polyester rubber, chloroprene rubber, polyester-based thermoplastic elastomer, and polyamide-based thermoplastic elastomer.

(13) The rubber member for downhole tools according to any one of (1) to (12) above, wherein the member contains a rubber having a hydrolyzable functional group.

(14) The rubber member for downhole tools according to any one of (1) to (13) above, wherein the member is a seal member.

(15) The rubber member for downhole tools according to any one of (1) to (13) above, wherein the member is a ball sealer or a ball seat.
(16) The rubber member for downhole tools according to any one of (1) to (13) above, wherein the member is a protecting member.

As specific modes according to another aspect of the present invention, the downhole tools of (A) and (B) below are provided.
(A) A downhole tool comprising the rubber member for downhole tools of any one of (1) to (16).
(B) The downhole tool according to (A) above, wherein the tool is selected from the group consisting of a frac plug, a bridge plug, a packer, and a sleeve system.

As specific modes of yet another aspect of the present invention, the methods for recovering the hydrocarbon resource of (I) to (V) below are provided.
(I) A method for recovering the hydrocarbon resource, the method comprising the step of using a downhole tool of (A) or (B) above.
(II) A method for recovering a hydrocarbon resource, the method comprising the step of using a downhole tool comprising a rubber member for downhole tools of any one of (1) to (16) above, wherein the rubber member for downhole tools is degraded inside a borehole after the borehole is isolated.
(III) A method for recovering a hydrocarbon resource, the method comprising the step of using a downhole tool comprising the rubber member for downhole tools of any one of (1) to (16) above, and further comprising other members for downhole tools containing degradable materials, wherein the rubber member for downhole tools is degraded inside a borehole after the borehole is isolated.
(IV) The method for recovering a hydrocarbon resource according to (III) above, wherein the degradable material contained in the other member for downhole tools is polyglycolic acid.
(V) A method for recovering a hydrocarbon resource, the method comprising the step of using a downhole tool comprising a rubber member for downhole tools described in any one of (1) to (16) above, the downhole tool being arranged such that the rubber member for downhole tools contacts other members for downhole tools and/or covers the other members for downhole tools, wherein the rubber member for downhole tools is degraded inside a borehole after a well treatment is performed.

Advantageous Effects of Invention

The first aspect of the present invention demonstrates the advantageous effect of providing a member for a downhole tool which, due to being a rubber member for downhole tools in which a decrease rate of a 50% strain compressive stress after immersion for 24 hours in 150° C. water relative to a 50% strain compressive stress before immersion is not less than 5%, can reliably perform downhole isolation and the operations of well treatment such as fracturing, and, as necessary, can be easily removed and can easily secure a flow path under a diversity of well environment conditions due to the increasing harshness and diversity of excavation conditions such as increasing depth, and which contributes to reduced expense or shortening of processes.

Another aspect of the present invention demonstrates the advantageous effect of providing a downhole tool which, due to being a downhole tool comprising the above rubber member for downhole tools, can reliably perform downhole isolation and the operations of well treatment such as fracturing, and, as necessary, can be easily removed and can easily secure a flow path under a diversity of well environment conditions due to the increasing harshness and diversity of excavation conditions such as increasing depth, and which contributes to reduced expense or shortening of processes.

Yet another aspect of the present invention demonstrates the advantageous effect of providing a method for recovering a hydrocarbon resource which, due to being a method for recovering a hydrocarbon resource using the above downhole tool, can reliably perform downhole isolation and the operations of well treatment such as fracturing, and, as necessary, can be easily removed and can easily secure a flow path under a diversity of well environment conditions due to the increasing harshness and diversity of excavation conditions such as increasing depth, and which contributes to reduced expense or shortening of processes.

BRIEF DESCRIPTION OF DRAWING(S)

DESCRIPTION OF EMBODIMENTS

Figure 1A:
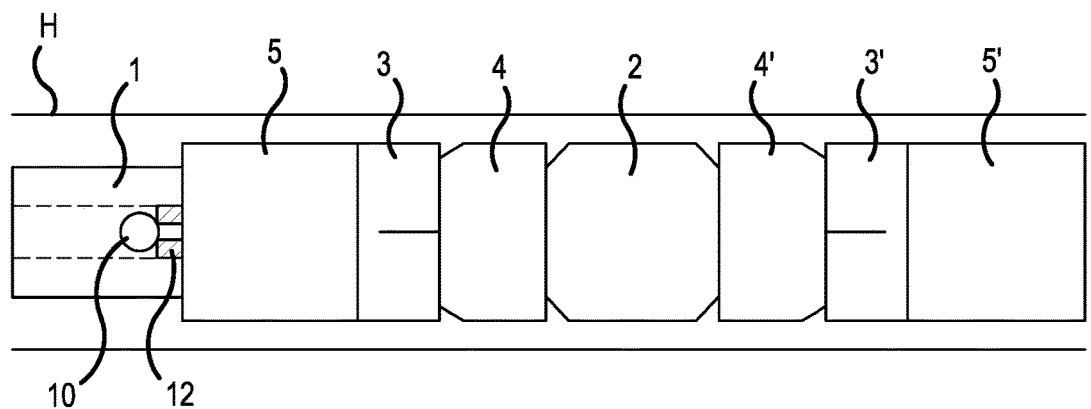
FIG. 1A is a schematic view illustrating a specific example of a downhole tool comprising the rubber member for downhole tools according to the present invention.

The first aspect of the present invention relates to a rubber member for downhole tools in which a decrease rate of a 50% strain compressive stress after immersion for 24 hours in 150° C. water relative to a 50% strain compressive stress before immersion is not less than 5%. Specifically, the first aspect of the present invention relates to a rubber member for downhole tools for recovering a hydrocarbon resource; other aspects of the present invention relate to a downhole tool, and a method for recovering a hydrocarbon resource.

I. Downhole tool and rubber member for downhole tool

1. Downhole Tool

"Downhole tool" is a generic name for a tool used to form a downhole (also called "borehole" and "subterranean borehole") which serves as a flow path of a hydrocarbon resource in order to recover that hydrocarbon resource after completion of the well. The tool is provided when performing well drilling from above ground (including above water) toward a productive layer in order to acquire a hydrocarbon resource such as petroleum such as shale oil or natural gas such as shale gas. Specific types include isolation plugs such as a frac plug, a bridge plug, a packer, and a cement retainer. Typically it is a structure in which an isolation member made of rubber is mounted around a mandrel, and the isolation mechanism of the isolation plug achieves an isolating effect by deforming the rubber by tension and/or compression of the mandrel. Sleeve systems (frac sleeves) such as sleeve pistons are also included among downhole tools.

2. Rubber Member for Downhole Tools

The rubber member for downhole tools of the present invention means a rubber member for downhole tools such as a ball seat used in a frac sleeve (sleeve system), or a seal member such as an isolation member in an isolation plug, which are downhole tools described above. The rubber member for downhole tools of the present invention is not particularly limited in its type, shape, and size. The rubber member for downhole tools of the present invention has a decrease rate of 50% strain compressive stress after immersion for 24 hours in 150° C. water relative to 50% strain compressive stress before immersion of not less than 5%. The rubber member for downhole tools of the present invention achieves an isolating effect by means of the rubber deforming due to tension and/or compression of the mandrel, and furthermore, has oil resistance, water resistance, and heat resistance, and can be easily degraded as necessary. As a result, it can be easily removed and can easily secure a flow path, and contributes to reduced expense or shortening of processes.

II. Downhole Tool

The downhole tool comprising the rubber member for downhole tools of the present invention is not particularly limited in its type, shape, size, and the like or in the aspect of comprising the rubber member for downhole tools, as long as it can demonstrate the anticipated advantageous effects of using the rubber member. From the viewpoint of exhibiting the advantageous effects of comprising the rubber member according to the present invention, it is preferably a downhole tool selected from the group consisting of a frac plug, a bridge plug, a packer, and a sleeve system.

Specific examples of the structure of a plug comprising the rubber member for downhole tools of the present invention will be described below in reference to FIG. 1 for a frac plug or bridge plug (also collectively called "plugs" hereinafter), which are typical downhole tools. The plug illustrated in FIG. 1 comprises a mandrel 1, a diameter-expandable circular rubber member 2, slips 3 and 3', wedges 4 and 4', and rings 5 and 5'. The diameter-expandable circular rubber member 2 qualifies as a usage example serving as a specific example of the rubber member for downhole tools of the present invention.

1. Mandrel

The mandrel 1 provided in the plug (i.e., the specific example of a downhole tool) comprising the rubber member for downhole tools of the present invention is normally called a "core rod", of which the cross-section has a substantially circular shape, the length is sufficiently long relative to the diameter of the cross-section, and it basically assures plug strength. In the mandrel 1 provided in the plug, the diameter of the cross-section is selected as appropriate according to the size of the downhole (borehole) (by making it slightly smaller than the inner diameter of the downhole, the plug can move inside the downhole, while on the other hand, as will be described later, there is a difference in diameter to an extent that enables downhole closure by expanding the diameter of the diameter-expandable circular rubber member 2 or the like). The length of the mandrel 1 is, for example, approximately 5 to 20 times the diameter of the cross-section but is not limited thereto. The diameter of the cross-section of the mandrel 1 is typically in the range of approximately 1 to 30 cm, and often in the range of 3 to 20 cm.

Hollow Part

The mandrel 1 provided in the plug may be solid, but from the perspectives of securing a flow path at the early stage of perforation and fracturing, reducing the weight of the mandrel, and controlling the degradation rate of the mandrel, it is preferably a hollow mandrel in which the mandrel 1 has a hollow part along the axial direction (the hollow part may penetrate the mandrel along the axial direction, or it may have one closed end in the axial direction and does not penetrate the mandrel along the axial direction). When the mandrel 1 has a hollow part along the axial direction, the cross-sectional shape of the mandrel 1 is a circular shape formed by two concentric circles forming the diameter (outside diameter) of the mandrel 1 and the outside diameter of the hollow part (corresponding to the inside diameter of the mandrel 1). The ratio of the diameters of the two concentric circles, i.e., the ratio of the diameter of the hollow part relative to the diameter of the mandrel 1, is preferably not greater than 0.7, more preferably not greater than 0.6, and even more preferably not greater than 0.5. When this ratio is too large, the thickness of the hollow mandrel is too thin, and as a result, the strength (in particular, the tensile strength) of the hollow mandrel may be insufficient when the plug is placed inside a downhole or at the time of well hole isolation or fracturing, and the plug may be damaged in extreme cases.

Outer Circumferential Surface and/or Inner Circumferential Surface of Mandrel

The diameter of the mandrel 1 and/or the outer diameter of the hollow part may be uniform along the axial direction of the mandrel 1, but may also vary along the axial direction. That is, convex parts, stepped parts, concave parts (grooves), or the like may be formed on the outer circumferential surface of the mandrel 1 due to the fact that the diameter of the mandrel 1 varies along the axial direction. In addition, convex parts, stepped parts, concave parts (grooves), or the like may be formed on the inner circumferential surface of the mandrel 1 due to the fact that the diameter of the hollow part (inner diameter of the mandrel 1) varies along the axial direction. The convex parts, stepped parts, or concave parts (grooves) on the outer circumferential surface and/or the inner circumferential surface of the mandrel may be used as sites for attaching or fixing other members to the outer circumferential surface and/or the inner circumferential surface of the mandrel 1, and in particular, as will be described later, they may serve as fixing parts for fixing a diameter-expandable circular rubber member. Also, when the mandrel 1 has a hollow part, it may have a seat for holding the ball used to control the flow of fluid.

Ends of Mandrel

On both ends of the mandrel 1, a screw part and a diameter expanded part may be provided such that a jig for tensioning and/or compressing the mandrel 1 can be engaged. In tensioning and/or compressing the mandrel 1, a high load of approximately 20 to 1000 kN, and often approximately 25 to 800 kN, is applied to both ends of the mandrel 1, and, depending on the design, a stress concentration 2 to 5 times greater sometimes occurs at the screw part, diameter expanded part, and the like (engagement part with the jig). Thus, a material having the strength to withstand such high load is selected for the mandrel 1, and the mandrel 1 must be designed so as to minimize the stress concentration.

Material

The material that forms the mandrel 1 provided in the plug is not particularly limited as long as it can basically assure the strength of the plug. For example, a metal material such as aluminum that is often used as a material that forms conventional mandrels may be used. Furthermore, a degradable material is preferably used as the material that forms the mandrel 1, from the perspective that it does not require a great deal of expense or time such as retrieval or physical destruction (milling or drill out) of the plug. The degradable material may be a degradable material that is, for example, biodegradable, meaning that it is degraded by microorganisms in the soil in which the fracturing fluid and the like are used, or hydrolyzable, meaning that it is degraded by a solvent such as fracturing fluid, particularly by water, and also by acids or alkalis if desired. Additionally, it may be a degradable material that can be degraded chemically by some other method. Preferably, it is a hydrolyzable material degraded by water of not less than a prescribed temperature. Furthermore, materials in which the intrinsic strength of resin decreases and the resin becomes weak due to a reduction in the degree of polymerization or the like, resulting in it disintegrating and losing its shape (also called "disintegrability" hereinafter) when a very small mechanical force is applied, also qualify as degradable materials.

A degradable resin is preferred as the degradable material that forms the mandrel 1 provided in the plug because it must have the strength expected for a material used in a high-temperature, high-pressure deep subterranean environment while also having excellent degradability. A degradable resin means a resin that is biodegradable, hydrolyzable, or can be degraded chemically by another method, as described above. Examples of the degradable resin include aliphatic polyesters such as polylactic acid (PLA), polyglycolic acid (PGA), and poly-ε-caprolactone (PCL), and polyvinyl alcohols (partially saponified polyvinyl alcohols and the like having a degree of saponification of 80 to 95 mol %) and the like, but it is more preferably an aliphatic polyester. Furthermore, components that form an aromatic polyester such as terephthalic acid may be used in combination provided that the properties as a degradable resin are not lost. The degradable resin may be used for one type alone or a combination obtained by blending two or more types.

From the perspective of the strength and degradability required in the mandrel 1, the aliphatic polyester is most preferably at least one type selected from the group consisting of PGA, PLA, and lactic acid-glycolic acid copolymer (PGLA), and PGA is even more preferred. The PGA encompasses not only homopolymers of glycolic acid, but also copolymers containing not less than 50 mass %, preferably not less than 75 mass %, more preferably not less than 85 mass %, even more preferably not less than 90 mass %, particularly preferably not less than 95 mass %, most preferably not less than 99 mass %, and above all, preferably not less than 99.5 mass %, of glycolic acid repeating units. The PLA encompasses not only homopolymers of L-lactic acid or D-lactic acid, but also copolymers containing not less than 50 mass %, preferably not less than 75 mass %, more preferably not less than 85 mass %, and even more preferably not less than 90 mass %, of L-lactic acid or D-lactic acid repeating units, and it may be a stereocomplex polylactic acid obtained by mixing a poly-L-lactic acid and a poly-D-lactic acid. As the PGLA, a copolymer in which the ratio (mass ratio) of glycolic acid repeating units to lactic acid repeating units is from 99:1 to 1:99, preferably from 90:10 to 10:90, and more preferably from 80:20 to 20:80, may be used.

Other Blended Components

The degradable material, preferably degradable resin that forms the mandrel 1 may also contain or be blended with various additives as other blended components, such as resin materials (other resins when the degradable material is a degradable resin), stabilizers, degradation accelerators or degradation inhibitors, and reinforcing materials, within a range that does not hinder the object of the present invention. The degradable material preferably contains a reinforcing material, and in this case, the degradable material can be called a degradable composite material. When the degradable material is degradable resin, it is so-called degradable reinforced resin. By including degradable materials as other blended components, it is possible to increase and adjust as necessary the degradability and disintegrability of the mandrel 1.

Reinforcing Material

As reinforcing materials, materials such as resin materials conventionally used as reinforcing materials with the objective of improving mechanical strength or heat resistance may be used, and fibrous reinforcing materials or granular or powdered reinforcing materials may be used. The reinforcing materials may be contained typically in the amount of not greater than 150 parts by mass, and preferably in the range of 10 to 100 parts by mass, relative to 100 parts by mass of the degradable material such as degradable resin.

Examples of fibrous reinforcing materials include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; kenaf fibers; aramid fibers; organic fibrous substances with a high melting point such as polyamides, polyesters, fluorine resins, and acrylic resins; and the like. Short fibers having a length of not greater than 10 mm, more preferably 1 to 6 mm, and even more preferably 1.5 to 4 mm are preferable as the fibrous reinforcing materials. Furthermore, inorganic fibrous substances are preferably used, and glass fibers are particularly preferable.

As the granular or powdered reinforcing material, mica, silica, talc, alumina, kaolin, calcium sulfate, calcium carbonate, titanium oxide, ferrite, clay, glass powder (milled fiber or the like), zinc oxide, nickel carbonate, iron oxide, quartz powder, magnesium carbonate, barium sulfate, and the like can be used. These reinforcing materials may be respectively used alone or in combinations of two or more types. The reinforcing material may be treated with a sizing agent or surface treatment agent as necessary.

66° C. Tensile Strength

The mandrel 1 preferably has a tensile strength at temperature 66° C. (also called "66° C. tensile strength" hereinafter) of not less than 5 MPa. Due to the fact that a plug comprising the rubber member for downhole tools of the present invention has a 66° C. tensile strength of not less than 5 MPa in the mandrel 1, the plug can have strength sufficient to withstand the tensile stress applied to the mandrel 1 in an environment of approximately 66° C. (equivalent to 150° Fahrenheit) which is generally the temperature in the shale gas layer (often it is from approximately 60° C. to approximately 70° C.). Furthermore, it is possible to control the ambient temperature around the mandrel 1 by injecting mud when expanding the diameter of the member made of rubber even in environments of temperature greater than 100° C., such as in the ground at depths greater than 3000 m. Thus, there is a high likelihood that it will have strength sufficient to withstand the tensile stress applied to the mandrel 1. The 66° C. tensile strength of the mandrel 1 is the maximum value of tensile stress until fracture measured in accordance with ISO 037 (JIS K6251), and the tensile strength (unit: MPa) is measured while a sample piece is left in an oven to make the test temperature 66° C. The 66° C. tensile strength of the mandrel 1 is more preferably not less than 50 MPa, even more preferably not less than 75 MPa, and particularly preferably not less than 100 MPa. In order to make the 66° C. tensile strength of the mandrel 1 not less than 5 MPa, methods by adjusting the type and characteristics (melt viscosity, molecular weight, and the like) of the degradable material, e.g., degradable resin, or the type, characteristics, and added amount of additives such as reinforcing materials, and by adjusting the thickness (cross-sectional area) or shape of the mandrel 1 may be used. The upper limit of 66° C. tensile strength is not particularly limited but is normally 1000 MPa, and often 750 MPa.

Fixing Part

As described above, the mandrel 1 may have convex parts, stepped parts, concave parts (grooves), or the like on the outer circumferential surface. These can be used as sites for attaching and fixing other members to the outer circumferential surface of the mandrel 1, and in particular, can be used as fixing parts for fixing the diameter-expandable circular rubber member 2.

As described in detail below, the diameter-expandable circular rubber member 2 expands in diameter in the direction orthogonal to the axial direction of the mandrel 1 as it is compressed in the axial direction of the mandrel 1 so as to come into contact with the inside wall H of the downhole and the outer circumferential surface of the mandrel 1 and plug (seal) the space between the plug and the downhole. Next, since it is necessary for the seal between the plug and the downhole to be maintained while perforation and fracturing are performed, the diameter-expandable circular rubber member 2 must be held by some means in an expanded state—that is, in a compressed state in the axial direction of the mandrel 1.

Since the mandrel 1 may have a convex part, stepped part, or concave part (groove) on the outer circumferential surface, the mandrel 1 provided in a plug (downhole tool) preferably has a fixing part for fixing the diameter-expandable circular rubber member 2 to the outer circumferential surface in the compressed state. This fixing part may be a convex part, stepped part, or concave part (groove) as described above, or a screw part or other means capable of fixing the diameter-expandable circular rubber member 2 to the outer circumferential surface of the mandrel 1 in the compressed state can be used. From the perspective of ease of processing and molding, strength, and the like, the fixing part is more preferably at least one type selected from the group consisting of a groove, stepped part, and a screw thread.

2. Diameter-Expandable Circular Rubber Member (Rubber Member for Downhole Tool)

Figure 1B:
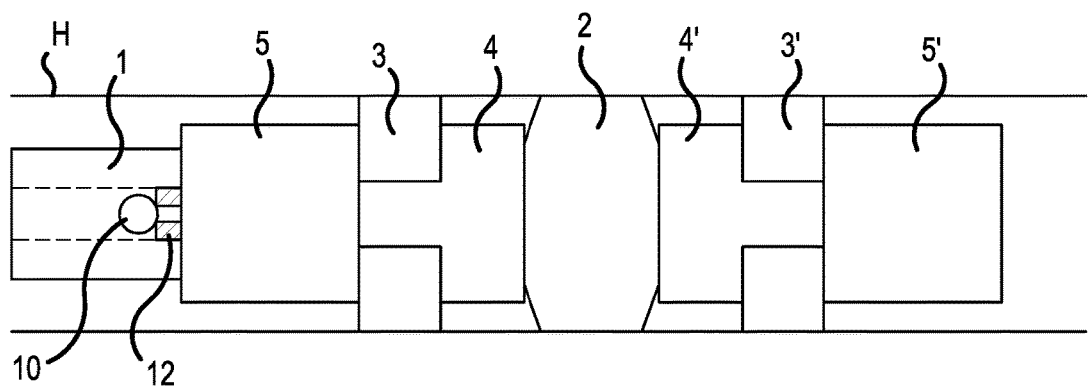
FIG. 1B is a schematic view illustrating a state in which the downhole tool comprising the rubber member for downhole tools according to the present invention is isolating a downhole.

When the diameter-expandable circular rubber member 2 provided in a plug comprising the rubber member for downhole tools of the present invention comes into contact directly or indirectly with the pair of rings 5 and 5', for example, those illustrated in FIGS. 1A and 1B, the force in the axial direction of the mandrel 1 is transmitted over the outer circumferential surface of the mandrel 1. As a result, the diameter-expandable circular rubber member 2 expands in diameter in a direction orthogonal to the axial direction of the mandrel 1 as it is compressed and reduced in diameter in the axial direction of the mandrel 1. The circular rubber member 2 expands in diameter, and the outward part in the direction orthogonal to the axial direction comes into contact with the inside wall H of the downhole, and additionally, the inward part in the direction orthogonal to the axial direction comes into contact with the outer circumferential surface of the mandrel 1, thereby isolating (sealing) the space between the plug and the downhole. The diameter-expandable circular rubber member 2 can maintain a state of contact with the inside wall H of the downhole and outer circumferential surface of the mandrel 1 while perforation and fracturing are performed, and has the function of maintaining the seal between the plug and the downhole (the borehole seal).

150° C. 24-Hour Compressive Stress Decrease Rate

In the present invention, the diameter-expandable circular rubber member 2 (rubber member for downhole tools) has the decrease rate of the 50% strain compressive stress after immersion for 24 hours in 150° C. water relative to the 50% strain compressive stress before immersion (also called "150° C. 24-hour compressive stress decrease rate" hereinafter) of not less than 5%. That is, the rubber member for downhole tools of the present invention is a rubber member for a degradable (including disintegrable as previously described) downhole tool of which the 150° C. 24-hour compressive stress decrease rate is not less than 5%. Due to the fact that the rubber member for downhole tools of the present invention has a 150° C. 24-hour compressive stress decrease rate of not less than 5%, the rubber member decomposes or disintegrates and disappears within several hours, several days, or several weeks in a downhole (attendant to diversification of depth, there are downhole environments at temperatures from approximately 60° C. to approximately 200° C., and recently at low temperatures from 25 to 40° C.). Thus, because it does not require a great deal of expense or time for retrieval or physical destruction or the like, it can contribute to reduced expense or shortening of processes for recovering a hydrocarbon resource. A rubber member for downhole tools requires a diversity of performance maintenance time and degradation time, such as diverse strength, according to the environment such as downhole temperature and according to the processes carried out in that environment. Due to the fact that the rubber member for downhole tools of the present invention has a 150° C. 24-hour compressive stress decrease rate of not less than 5%, it has the characteristic of maintaining strength for a certain time and then degrading in various downhole temperature environments, such as 177° C. (350° F.), 163° C. (325° F.), 149° C. (300° F.), 121° C. (250° F.), 93° C. (200° F.), 80° C., or 66° C., as well as 25 to 40° C. Therefore, the optimal rubber member can be selected according to the downhole environment and processes from the rubber members for downhole tools of the present invention, of which the 150° C. 24-hour compressive stress decrease rate is not less than 5%. Furthermore, in the rubber member for downhole tools of the present invention, the factors involved in the degradation time, degradation speed, and the like, and the degree to which they can be controlled, vary depending on the type of rubber material that forms the rubber member for downhole tools. For example, it is possible to control the degradation speed by the following means: adjusting the degree of vulcanization, i.e., controlling the extent of cross-linking between molecular chains; changing the vulcanization method and changing the type and ratio of the cross-linking agent; changing the degree of hardness (in general, degradation is suppressed when hardness is increased, and degradation is accelerated when hardness is decreased); adjusting the type and quantity of fillers and blending agents such as hydrolysis inhibitors; and changing molding conditions and curing conditions.

The rubber member for downhole tools of the present invention has a 150° C. 24-hour compressive stress decrease rate of preferably not less than 10%, and more preferably not less than 20%, from the perspective of better degradability (or disintegrability) (degrading in a desired short time). Although it also depends on the magnitude of the initial 50% strain compressive stress of the rubber member for downhole tools descried later (also called "50% strain compressive stress measured before immersion in 150° C. water"), the 150° C. 24-hour compressive stress decrease rate is more preferably not less than 50%, particularly preferably not less than 70%, most preferably not less than 80%, and even more preferably not less than 90%. The upper limit of the 150° C. 24-hour compressive stress decrease rate of the rubber member for downhole tools is 100%. The rubber member for downhole tools of the present invention may be adjusted as necessary so that the 150° C. 24-hour compressive stress decrease rate is 100% and the decrease rate of the 50% strain compressive stress after immersion for 24 hours in water of various temperatures, such as 93° C., 66° C., 40° C. or 25° C., relative to the 50% strain compressive stress before immersion is, for example, not greater than 30%, not greater than 10%, not greater than 8%, or less than 5%.

If the 150° C. 24-hour compressive stress decrease rate is not less than 80%, the rubber member for downhole tools after immersion for 24 hours in 150° C. water often loses its shape when touched lightly with the hand, although it also depends on the magnitude of the initial 50% strain compressive stress. Similarly, if it is not less than 95%, there are cases where it does not maintain its shape to the extent that it is difficult to remove, and also similarly, if not less than 99%, there are cases where it is macroscopically visible that the shape is not maintained.

The method for measuring the 150° C. 24-hour compressive stress decrease rate of the rubber member for downhole tools is as follows. Specifically, a sample of a rubber member for downhole tools cut out to a size of 5 mm each in thickness, length, and width is immersed in 400 mL of 150° C. deionized water and then removed after 24 hours, and the compressive stress at room temperature is measured in accordance with JIS K7181 (conforming to ISO 604), and the compressive stress at 50% compressive strain (unit: MPa; also called "50% strain compressive stress" hereinafter) is determined. By comparing with the 50% strain compressive stress measured in advance before immersion in 150° C. water ("initial compressive stress"), the decrease rate (unit: %) relative to the initial compressive stress is calculated. When the sample of rubber member for downhole tools degrades and/or elutes while immersed in 150° C. water and loses its shape or disappears, or, when the sample of rubber member for downhole tools disintegrates before reaching 50% strain when compressive stress is measured, the decrease rate is taken to be 100%.

The initial compressive stress of the rubber member for downhole tools of the present invention, i.e., the 50% strain compressive stress before immersion in 150° C. water, is not particularly limited as long as the strength of the rubber member for downhole tools is maintained and it can reliably continue to isolate the downhole for the duration required to perform well treatment such as fracturing in the deep underground downhole (the required duration including transport or moving the plug to the prescribed location, isolating the downhole with the rubber member for downhole tools, and preparation for and implementation of perforation or fracturing; generally about 1 to 2 days). However, it is normally not less than 5 MPa, and often not less than 7 MPa, and particularly preferably not less than 10 MPa. There is no particular upper limit on the initial 50% strain compressive stress of the rubber member for downhole tools, but from the perspectives of ease of handling and degradability (or disintegrability), it is normally not greater than 200 MPa, and often not greater than 150 MPa.

150° C. Volume Increase Rate

If the increase rate of the volume after immersion for 6 hours in 150° C. water relative to the volume before immersion (also called "150° C. volume increase rate" hereinafter) of the rubber member for downhole tools of the present invention is less than 20%, it is preferred that the strength of the rubber member for downhole tools is maintained and it can more reliably continue to isolate the downhole for the duration required to perform well treatment such as fracturing in the deep underground downhole. The 150° C. volume increase rate is more preferably less than 15%, even more preferably less than 10%, and particularly preferably less than 6%. The lower limit of the 150° C. volume increase rate is normally 0%, but depending on desire, the rubber material that forms the rubber member for downhole tools may be one whose volume after immersion for 6 hours in 150° C. water decreases relative to the volume before immersion (also referred to as "150° C. volume increase rate is less than 0%" or "150° C. volume increase rate decreases") as a result of it degrading and dispersing in the water while immersed. For example, in the case of a rubber member for downhole tools of which the 150° C. 24-hour compressive stress decrease rate is 100%, the 150° C. volume increase rate is often less than 0% (volume decreases), and it is acceptable if the increase rate of the volume after immersion for 6 hours in 150° C. water relative to the volume before immersion is not greater than −1% or not greater than −3% (equivalent to a decrease rate relative to the volume before immersion of not less than 1% or not less than 3%).

The method for measuring the 150° C. volume increase rate of the rubber member for downhole tools is as follows. Specifically, a sample of rubber member for downhole tools cut out to a size of 5 mm in thickness, 50 mm in length, and 50 mm in width is immersed in 150° C. water and then removed after 6 hours, and the volume of the sample is measured in accordance with JIS K6258, and the volume change rate relative to the volume of the sample measured in advance before immersion in 150° C. water is calculated (unit: %).

23° C. Compressive Stress Decrease Rate

The rubber member for downhole tools is preferred because the strength of the rubber member for downhole tools is maintained and it can more reliably continue to isolate the downhole for the duration required to perform well treatment such as fracturing, due to the facts that it is stable in dry environment conditions and that the decrease rate of the 50% strain compressive stress after immersion for 6 hours in 23° C. water relative to the 50% strain compressive stress after immersion for 1 hour (also called "23° C. compressive stress decrease rate" hereinafter) is less than 5%. Specifically, isolation (in a protecting member, a protecting function such as a sensor) of the downhole is no longer lost in an unexpectedly short time due to the fact that excavation conditions for hydrocarbon resource recovery has become diverse. In particular, due to the fact that the rubber member for downhole tools is stable in dry environment conditions, the seal function (in a protecting member, a protecting function) is not lost at the stage where the downhole tool comprising the rubber member for downhole tools of the present invention is arranged in a borehole and before well treatment such as fracturing is performed. The measurement method of the 23° C. compressive stress decrease rate of the rubber member for downhole tools is the same as the measurement method of the 150° C. 24-hour compressive stress decrease rate, but instead of being immersed in 150° C. water, it is immersed for the required time in 23° C. water. The 23° C. compressive stress decrease rate is more preferably less than 4%, and even more preferably less than 3%. The lower limit of the 23° C. compressive stress decrease rate is 0%. Note that for the rubber member for downhole tools of the present invention, "stable in dry environment conditions" means that the 50% strain compressive stress does not decrease for at least 168 hours (7 days) in an environment at temperature 23° C. and relative humidity 50%.

150° C. 72-Hour Mass Loss Rate

Due to the fact that the rubber member for downhole tools of the present invention has a loss rate of mass after immersion for 72 hours in 150° C. water relative to the mass before immersion (also called "150° C. 72-hour mass loss rate" hereinafter) of 5% to 100%, it decomposes or disintegrates, and more desirably, disappears (also called "degradation" hereafter) within several hours to several weeks in a downhole (attendant to diversification of depth, there are downhole environments at temperatures from approximately 60° C. to approximately 200° C., and recently at low temperatures from 25 to 40° C.), and the seal function and the like are lost. Thus, because it does not require a great deal of expense or time for retrieval or physical destruction or the like, it can contribute to reduced expense or shortening of processes for recovering a hydrocarbon resource. For example, if the 150° C. 72-hour mass loss rate is 100%, the mass is 0 after the rubber member for downhole tools is immersed for 72 hours in 150° C. water, meaning that it has completely disappeared, which is desirable. Due to the fact that the rubber member for downhole tools of the present invention has a 150° C. 72-hour mass loss rate of 5% to 100%, it has the characteristic of maintaining strength for a fixed time and then degrading in various downhole temperature environments, such as 177° C., 163° C., 149° C., 121° C., 93° C., 80° C., or 66° C., as well as 25 to 40° C. Therefore, the optimal rubber member can be selected according to the downhole environment and processes from the rubber members for downhole tools of the present invention, of which the 150° C. 72-hour mass loss rate is 5% to 100%.

Although it also depends on the magnitude of the initial mass (called "mass measured before immersion in 150° C. water"), the rubber member for downhole tools of the present invention has a 150° C. 72-hour mass loss rate of preferably 10 to 100% and more preferably 20 to 100%, from the perspective of better degradability (degrading in a desired short time). The rubber member for downhole tools of the present invention may be designed and adjusted so that the 150° C. 72-hour mass loss rate is 100%, and the loss rate of mass after immersion for 72 hours in water of various temperatures, such as 93° C., 66° C., or the like, relative to the initial mass is, for example, not greater than 20%, not greater than 10%, or less than 5%.

The method for measuring the 150° C. 72-hour mass loss rate of the rubber member for downhole tools is as follows. Specifically, a sample of a rubber member for downhole tools cut out to a size of 20 mm each in thickness, length, and width is immersed in 400 mL of 150° C. water (deionized water or the like) and then removed after 72 hours, and by comparing the mass of the sample measured after immersion to the mass of the sample measured in advance before immersion in 150° C. water ("initial mass"), the loss rate (unit: %) of mass relative to the initial mass is calculated.

66° C. Tensile Fracture Strain

The rubber member for downhole tools of the present invention is preferred because the strength of the rubber member for downhole tools is maintained and it can reliably continue to isolate the downhole for the duration required to perform well treatment such as fracturing, because the tensile fracture strain at 66° C. (also called "66° C. tensile fracture strain" hereinafter) is not less than 50%. Specifically, when a borehole is isolated (sealed) using a rubber member for downhole tools, there is no risk of the rubber member for downhole tools breaking even if it is deformed so as to reliably engage with the shape of the downhole tool and the shape of the downhole (shape of the casing), and specifically, even if it is deformed while incurring large tensile force (and compressive force). Therefore, the contact area of the rubber member for downhole tools and the casing is large, resulting in reliable isolation. Additionally, it has the effect that the fluid seal is difficult to break even if it incurs large tensile force (and compressive force) due to extremely high pressure being applied by fluid for implementing a treatment that requires sealing such as fracturing. The 66° C. tensile fracture strain is the strain measured at tensile fracture at 66° C. in accordance with ISO 37 (JIS K6251). The 66° C. tensile fracture strain is preferably not less than 80%, and more preferably not less than 100%. The 66° C. tensile fracture strain does not have a particular upper limit, but it is normally not greater than 500% and often not greater than 480% because if the 66° C. tensile fracture strain is too high, the rubber member for downhole tools may not easily break into small fragments when it is degraded and loses strength after the required well treatments.

66° C. Compressive Stress

The rubber member for downhole tools of the present invention is preferred because the strength of the rubber member for downhole tools is maintained and it can more reliably continue to isolate the downhole for the duration required to perform well treatment such as fracturing, because the 70% strain compressive stress at 66° C. (also called "66° C. compressive stress" hereinafter) is not less than 10 MPa. Specifically, when a borehole is isolated (sealed) using a rubber member for downhole tools, there is no risk of the rubber member for downhole tools breaking even if it is deformed so as to reliably engage with the shape of the downhole tool and the shape of the downhole (shape of the casing), and specifically, even if it is deformed while incurring large compressive force (and tension). Therefore, the contact area of the rubber member for downhole tools and the casing is large, resulting in reliable isolation. Additionally, it has the effect that the fluid seal is difficult to break even if it incurs large compressive force (and tensile force) due to extremely high pressure being applied by fluid for implementing a treatment that requires sealing such as fracturing. The 66° C. compressive stress (i.e., 70% strain compressive stress at 66° C.) represents the maximum stress value until fracture when it fractures before reaching the compressive stress at compressive strain of 70% (unit: MPa) or 70% compressive strain, measured at 66° C. in accordance with ISO 14126 (JIS K7018). The 66° C. compressive stress is preferably not less than 12 MPa, and even more preferably not less than 15 MPa. The upper limit of the 66° C. compressive stress is not particularly limited, but is normally not greater than 200 MPa, and often not greater than 150 MPa.

66° C. Compressive Stress Ratio

The rubber member for downhole tools of the present invention is preferred because the strength of the rubber member for downhole tools is maintained and it can more reliably continue to isolate the downhole for the duration required to perform well treatment such as fracturing, because the ratio of the 70% strain compressive stress relative to the compressive stress at 5% compressive strain (also called "5% strain compressive stress" hereinafter) at 66° C. is not less than 5. Specifically, when a borehole is isolated (sealed) using a rubber member for downhole tools, it is capable of deforming so as to reliably engage with the shape of the downhole tool and the shape of the downhole (shape of the casing) because the initial compressive strain of the rubber member for downhole tools is small (it deforms easily), and additionally, when it is deformed while incurring large compressive force (and tensile force), due to the stress of the rubber member rising greatly in regions where the amount of deformation is large, it results in a state where the rubber member of the contact portion of the rubber member with the casing has a high compressive force (and tensile force), and as a result, even when high pressure is applied, for example when a well treatment requiring a seal such as fracturing is performed, it has sufficient seal performance and isolation is reliable. The 66° C. compressive stress ratio is measured at 66° C. in accordance with ISO 14126 (JIS K7018). The 66° C. compressive stress ratio is preferably not less than 8, and even more preferably not less than 10. The upper limit of the 66° C. compressive stress ratio is not particularly limited, but is normally not greater than 200, and often not greater than 150. Furthermore, in many cases, if the rubber member for downhole tools of the present invention which has a 66° C. compressive stress ratio of not less than 5 also has a ratio of compressive stress at 70% compressive strain relative to compressive stress at 5% compressive strain of not less than 5 at other temperatures, such as, for example, the range from room temperature to 149° C., it is more desirable because it can fulfill the seal function and the like in the aforementioned wide temperature range. However, even if the above compressive stress ratio of a rubber member for downhole tools is less than 5 in part of the above temperature range, for example, at temperature 149° C., that rubber member for downhole tools is not hindered from practical use as long as the 66° C. compressive stress ratio is not less than 5.

66° C. Compressive Fracture Strain

The rubber member for downhole tools of the present invention is preferred because the strength of the rubber member for downhole tools is maintained and it can reliably continue to isolate the downhole for the duration required to perform well treatment such as fracturing, because the compressive fracture strain at 66° C. (also called "66° C. compressive fracture strain" hereinafter) is not less than 50%. The 66° C. compressive fracture strain is the strain measured at compressive fracture at 66° C. in accordance with ISO 14126 (JIS K7018). The 66° C. compressive fracture strain is preferably not less than 60%, and more preferably not less than 70%. The upper limit of the 66° C. compressive fracture strain is 100%, but is normally not greater than 99%.

Surface Hardness

In addition to the desired characteristics of 66° C. tensile fracture strain, 66° C. compressive stress, and 66° C. compressive fracture strain described above, it is preferred that the rubber member for downhole tools of the present invention has surface hardness in the range of A60 to D80 from the perspective of seal function. The surface hardness of a rubber member for downhole tools means the surface hardness expressed as type A (also called "surface hardness A" or simply "hardness A" hereinafter) or type D (also called "surface hardness D" or simply "hardness D" hereinafter) of durometer hardness measured in accordance with ISO 7619. Types of durometer hardness include type A for medium hardness suitable for general rubbers and the like, type D for high hardness suitable for hard rubbers and the like, and type E for low hardness suitable for sponges and the like (for example, hardness A100 is often roughly equivalent to hardness D60). Due to the fact that the hardness of the rubber member for downhole tools of the present invention is in the range of A60 to D80, it can be configured such that borehole sealing can be performed while withstanding high-pressure fluid pressurization of fracturing and the like by also adjusting the structure and the like of the rubber member as desired. The surface hardness of the rubber member for downhole tools is more preferably in the range of A65 to D78, and even more preferably A70 to D75.

Degradable (or Disintegrable) Rubber Material

The rubber material that forms the rubber member for downhole tools of the present invention is not particularly limited as long as the 150° C. 24-hour compressive stress decrease rate is within the prescribed range, and may be selected from rubber materials used in conventional downhole tools. For example, a rubber member for downhole tools containing at least one type selected from the group consisting of urethane rubber, natural rubber, polyisoprene, ethylene propylene rubber, butyl rubber, styrene rubber (styrene-butadiene rubber and the like), acrylic rubber, aliphatic polyester rubber, chloroprene rubber, polyester-based thermoplastic elastomer, and polyamide-based thermoplastic elastomer is preferred. In addition, from the perspective of degradability and disintegrability, a rubber member for downhole tools containing rubber having a hydrolyzable functional group (for example, a urethane group, ester group, amide group, carboxyl group, hydroxyl group, silyl group, acid anhydride, acid halide, and the like) is also preferred. A particularly preferable rubber material is a urethane rubber since it is possible to easily control the degradability or disintegrability thereof by adjusting the structure, hardness, degree of crosslinking, and the like of the rubber material or selecting other compounding agents. Specifically, a rubber member for downhole tools containing urethane rubber is a particularly preferred rubber member for downhole tools. Furthermore, nitrile rubbers or hydrogenated nitrile rubbers, which are rubber materials that are conventionally used widely for downhole tools due to their excellent oil resistance, heat resistance, water resistance, and the like, often are not suitable as materials for forming the rubber member for downhole tools of the present invention because it is normally difficult to achieve a 150° C. 24-hour compressive stress decrease rate within the prescribed range.

Due to the fact that the rubber member for downhole tools formed from the above rubber material has a 150° C. 24-hour compressive stress rate of not less than 5%, preferably not less than 20%, and particularly preferably not less than 50%, and due the fact that its 150° C. volume increase rate is less than 20% and preferably decreases, and the 150° C. 24-hour compressive stress decrease rate is not less than 5%, and due to the fact that its 150° C. 72-hour mass loss rate is from 5% to 100%, and due to the fact that, depending on desire, the 66° C. tensile fracture strain is not less than 50%, the 66° C. compressive stress is not less than 10 MPa, and the 66° C. compressive fracture strain is not less than 50%, and due to the fact that its surface hardness is in the range of A60 to D80, and due to the fact that its 23° C. compressive stress decrease rate is less than 5%, and also due to the fact that its 66° C. compressive stress ratio is not less than 5, the rubber member for downhole tools may be, for example, biodegradable, meaning that it is degraded by microorganisms in the soil in which the fracturing fluid and the like are used, or hydrolyzable, meaning that it is degraded by a solvent such as fracturing fluid, particularly by water, and also by acids or alkalis if desired, and additionally, may be degradable material that can be degraded chemically by some other method, and in particular, it may be hydrolyzable, meaning that it is degraded by water of at least a prescribed temperature. Furthermore, as described above, the rubber member for downhole tools may also be one in which the intrinsic strength of the rubber material decreases and the rubber material becomes weak due to a reduction in the degree of polymerization or the like, resulting in it easily disintegrating and losing its shape (disintegrability) when a very small mechanical force is applied. As a characteristic particularly suitable in a rubber member for downhole tools, since it is required to have easy disintegrability, meaning that it disintegrates after a prescribed time by fluid such as fracturing fluid, a urethane rubber, acrylic rubber, polyester-based thermoplastic elastomer, or polyamide-based thermoplastic elastomer are preferably used, and they may be used alone or in a mixture with another rubber material or a resin material.

Urethane Rubber

The urethane rubber particularly preferably used as the rubber material that forms the rubber member for downhole tools of the present invention (also called "urethane elastomer") is a rubber material having a urethane bond (—NH—CO—O—) in the molecule, and is normally obtained by condensation with an isocyanate compound and a compound having a hydroxyl group. As the isocyanate compound, aromatic (optionally having a plurality of aromatic rings), aliphatic, or alicyclic di-, tri-, or tetra-polyisocyanates or mixtures thereof are used. The compound having a hydroxyl group is, for example, a polyester having an ester-bond in the main chain thereof or a polyether having an ether-bond in the main chain thereof. Urethane rubbers are broadly classified into polyester-type urethane rubbers (also called "ester-based urethane rubbers" hereinafter) and polyether-based urethane rubbers (also called "ether-type urethane rubbers" hereinafter), and ester-based urethane rubbers are preferred in many cases because their degradability and disintegrability are easier to control. Urethane rubber is an elastic body having both the elasticity (flexibility) of synthetic rubber and the rigidity (solidity) of plastic. It is generally known to have excellent abrasion resistance, chemical resistance, and oil resistance, high mechanical strength, high load tolerance, and high elasticity with high energy absorbency. Depending on the molding method, urethane rubber can be classified into i) kneaded (millable) type, which can be molded by the same processing method as general rubber; ii) cast molding type, which can be molded by thermocuring process methods using liquid starting materials; and iii) thermoplastic type, which can be molded by the same processing methods as thermoplastic resin. Any type may be used as the urethane rubber that forms the rubber member for downhole tools. Furthermore, among the above types, for the thermoplastic urethane rubber belonging to type iii) thermoplastic type, thermoplastic urethane rubber (crosslinked type) that forms a crosslinked structure can be produced by using a crosslinking agent. The crosslinking method can be any means such as thermal crosslinking or electron beam crosslinking. For example, a crosslinked structure may be formed by thermal crosslinking after mixing in a crosslinking agent at the melt molding stage such as injection molding or extrusion molding. Any crosslinking agent suited to thermoplastic urethane rubber may be used as the crosslinking agent. The used amount of crosslinking agent may be adjusted as appropriate, and by adjusting the used amount in the range of, for example, 5 to 30 parts by mass relative to 100 parts by mass of thermoplastic urethane rubber, the degradation behavior of the rubber member can be controlled to a certain extent.

Acrylic Rubber

The preferably used acrylic rubber contained in a rubber member for downhole tools that contains an acrylic rubber is generically called a rubber-like polymer having an acrylic acid ester as the main component. These include ACM, which is a copolymer of an acrylic acid ester and chloroethyl vinyl ether, ANM, which is a copolymer of an acrylic acid ester and acrylonitrile, and the like. Because acrylic rubber does not contain an unsaturated bond in the main chain, it has high chemical stability and has characteristics such as heat resistance, oil resistance, aging resistance, and the like. On the other hand, it is suitable as the rubber material that forms the rubber member for downhole tools of the present invention because it disintegrates over time because it has inferior water resistance and water vapor resistance.

Polyester-Based Thermoplastic Elastomer

The preferably used polyester-based thermoplastic elastomer contained in a rubber member for downhole tools that contains a polyester-based thermoplastic elastomer is an elastomer having a polyester-based block copolymer as the main component. Specific examples include block copolymers of a hard segment consisting of polyester and a soft segment consisting of polyether. Examples of the hard segment include aromatic polyesters and aliphatic polyesters, more specifically polyethylene terephthalate, polybutylene terephthalate, polyethylene naphthalate, polybutylene naphthalate, polyhydroxyalkanoic acid, and the like. Examples of the soft segment include polyethers such as polyethylene glycol, polypropylene glycol, polytetramethylene ether glycol, and the like. Other examples are block copolymers in which the hard segment and the soft segment consist of polyesters. Examples of the hard segment include aromatic polyesters, more specifically polyethylene terephthalate, polybutylene terephthalate, polyethylene naphthalate, polybutylene naphthalate, and the like. Examples of the soft segment include aliphatic polyesters having lower elasticity than the hard segment, such as polyhydroxyalkanoic acids having an alkyl chain length of 2 or more. The types and the ratio of these hard segments and soft segments may be adjusted so as to conform to the desired physical properties of the elastomer, particularly the desired degradation characteristics and mechanical characteristics. Additionally, a polyester-based thermoplastic elastomer having the desired physical properties may be obtained by further combining various compounding agents as necessary. The polyester-based thermoplastic elastomer has the characteristics of both plastic and rubber, and can be molded by injection molding, extrusion molding, blow molding, or the like. Additionally, due to having an ester bond, it has the characteristic of readily disintegrating in a prescribed time. To cite commercially available products, Pelprene® P type P30B (hardness A71; "hardness" is durometer type hardness in accordance with ISO 7619 (also simply called "hardness" hereinafter)), P40B (hardness A82), P40H (hardness A89), and P55B (hardness A94) manufactured by Toyobo Co., Ltd., and Hytrel® 3046 (hardness A77), G3548L (surface hardness A80), and 4047N (hardness A90) manufactured by DuPont-Toray Co., Ltd., and the like are materials with relatively high hardness for rubber. Their hardness is suited to the high-temperature, high-pressure conditions assumed in a downhole tool environment, and they are rubber materials suitable for a rubber member for downhole tools. Additionally, Pelprene® S type S1001 (hardness A96) and S9001 (hardness A99) and Hytrel® 6377 (hardness D63) and 7277 (hardness D72) and the like have hardness suited to seal applications and the like as a thin rubber member, and are rubber materials suitable for a rubber member for downhole tools. These polyester-based thermoplastic elastomers may be used alone but may also be used as a mixture with other thermoplastic elastomers and/or resin materials.

Polyamide-Based Thermoplastic Elastomer

The preferably used polyamide-based thermoplastic elastomer contained in a rubber member for downhole tools that contains a polyamide-based thermoplastic elastomer is a block copolymer of a hard segment consisting of polyamide and a soft segment consisting of a polyether and/or polyester. Examples of the hard segment include aliphatic polyamides, more specifically Nylon 6, Nylon 11, and Nylon 12, and examples of the soft segment include polyethers such as polyethylene glycol, polypropylene glycol, polytetramethylene ether glycol, and the like. The types and the ratio of these hard segments and soft segments may be adjusted so as to conform to the desired physical properties of the elastomer, particularly the desired degradation characteristics and mechanical characteristics. Additionally, a polyamide-based thermoplastic elastomer having the desired physical properties may be obtained by further combining various compounding agents as necessary. The polyamide-based thermoplastic elastomer has intermediate properties between rubber and plastic, and can be molded by various mold processing techniques such as injection molding, extrusion molding, and blow molding. Additionally, due to having an amide bond, it has the characteristic of hydrolyzing and readily disintegrating at high temperature and high pressure. Examples of commercially available products include TPAE-12 (hardness D12), TPAE-38 (hardness D32), TPAE-10 (hardness D41), TPAE-23 (hardness D62), and PA-260 (hardness D69) manufactured by T&K TOKA Corp., and the like. Since they have hardness suited to seal applications and the like as a thin rubber member, they are rubber materials suitable for a rubber member for downhole tools. These polyamide-based thermoplastic elastomers may be used alone but may also be used as a mixture with other thermoplastic elastomers and/or resin materials.

Specific Examples of Urethane Rubber

The following urethane rubbers can be cited as preferably used urethane rubbers.

(1) Using lactone-based ester-type thermoplastic urethane rubber (crosslinked type) of hardness D74, it is possible to prepare a rubber member for downhole tools of which the 150° C. 24-hour compressive stress decrease rate is 82% and the 150° C. volume increase rate is less than 1%.

(2) Using ester-type thermoplastic urethane rubber (crosslinked type) of hardness A95, it is possible to prepare a rubber member for downhole tools of which the 150° C. 24-hour compressive stress decrease rate is 100% and the 150° C. volume increase rate is 2%. The 150° C. 72-hour mass loss rate of this rubber member was 58%, the mass loss rate was −1% (a volume increase) after immersion for 1 hour in 150° C. water, −2% (a volume increase) after immersion for 3 hours, and 13% after immersion for 24 hours.

(3) Using lactone-based ester-type thermoplastic urethane rubber (uncrosslinked type) of hardness D74, it is possible to prepare a rubber member for downhole tools of which the 150° C. 24-hour compressive stress decrease rate is 83% and the 150° C. volume increase rate is 1%. The 150° C. 72-hour mass loss rate of this rubber member was 43%, the mass loss rate was −1% (a volume increase) after immersion for 1 hour in 150° C. water, −2% (a volume increase) after immersion for 3 hours, 2% after immersion for 24 hours, and 33% after immersion for 48 hours.

(4) Using ester-type thermoplastic urethane rubber (uncrosslinked type) of hardness A70, it is possible to prepare a rubber member for downhole tools of which the 150° C. 24-hour compressive stress decrease rate is 100% and the 150° C. volume increase rate is 5%.

(5) Using ester-type thermoplastic urethane rubber (uncrosslinked type) of hardness A85, it is possible to prepare a rubber member for downhole tools of which the 150° C. 24-hour compressive stress decrease rate is 100% and the 150° C. volume increase rate is 3%. For this rubber member, when the decrease rate of 50% strain compressive stress after immersion for a prescribed time in 121° C. water relative to the 50% strain compressive stress before immersion (also called "compressive stress decrease rate at 121° C." hereinafter) was measured, it was 21% after immersion for 24 hours, and 100% after immersion for 48 hours and 72 hours. It was found that the test specimen after immersion for 48 hours and 72 hours cracked after the compressive stress test, and its shape did not recover.

(6) Using ester-type thermoplastic urethane rubber (crosslinked type) of hardness A85, it is possible to prepare a rubber member for downhole tools of which the 150° C. 24-hour compressive stress decrease rate is 41% and the 150° C. volume increase rate is 4.9%. For this rubber member, when the compressive stress decrease rate at 121° C. was measured, it was 1% after immersion for 24 hours, 1% after immersion for 48 hours, and 100% after immersion for 72 hours. It was found that the test specimen after immersion for 72 hours cracked after the compressive stress test, and its shape did not recover. Furthermore, the 66° C. tensile fracture strain of this rubber member was 414%, the 66° C. compressive stress was 41 MPa, and the 66° C. compressive fracture strain was not less than 95%. Additionally, it was stable in dry environment conditions, and the 23° C. compressive stress decrease rate was 0%, the compressive stress ratio at 66° C. was 20, and the 150° C. 72-hour mass loss rate was 72%.

(7) Using ester-type thermoplastic urethane rubber (crosslinked type) of hardness A80, it is possible to prepare a rubber member for downhole tools of which the 150° C. 24-hour compressive stress decrease rate is 51% and the 150° C. volume increase rate is 1.2%. The 66° C. tensile fracture strain of this rubber member was 414%, the 66° C. compressive stress was 34 MPa, and the 66° C. compressive fracture strain was not less than 95%. Additionally, it was stable in dry environment conditions, and the 23° C. compressive stress decrease rate was 0%, the 66° C. compressive stress ratio was 26, and the 150° C. 72-hour mass loss rate was 75%.

(8) Using ester-type thermoplastic urethane rubber (uncrosslinked type) of hardness A80, it is possible to prepare a rubber member for downhole tools of which the 150° C. 24-hour compressive stress decrease rate is 71% and the 150° C. volume increase rate is 0.8%. The 66° C. tensile fracture strain of this rubber member was 440%, the 66° C. compressive stress was 20 MPa, and the 66° C. compressive fracture strain was not less than 95%. Additionally, it was stable in dry environment conditions, and the 23° C. compressive stress decrease rate was 0%, the 66° C. compressive stress ratio was 29, and the 150° C. 72-hour mass loss rate was 85%.

(9) Using ester-type thermoplastic urethane rubber (crosslinked type) of hardness A90, it is possible to prepare a rubber member for downhole tools of which the 150° C. 24-hour compressive stress decrease rate is 32% and the 150° C. volume increase rate is less than 1%. The 66° C. tensile fracture strain of this rubber member was 375%, the 66° C. compressive stress was 55 MPa, and the 66° C. compressive fracture strain was not less than 95%. Additionally, it was stable in dry environment conditions, and the 23° C. compressive stress decrease rate was 0%, the 66° C. compressive stress ratio was 16, and the 150° C. 72-hour mass loss rate was 63%.

(10) Using ester-type thermoplastic urethane rubber (uncrosslinked type) of hardness A90, it is possible to prepare a rubber member for downhole tools of which the 150° C. 24-hour compressive stress decrease rate is 52%. The 66° C.

tensile fracture strain of this rubber member was 467%, the 66° C. compressive stress was 33 MPa, and the 66° C. compressive fracture strain was not less than 95%. Additionally, it was stable in dry environment conditions, and the 23° C. compressive stress decrease rate was 0%, the 66° C. compressive stress ratio was 28, and the 150° C. 72-hour mass loss rate was 72%.

(11) Using ester-type thermosetting urethane rubber (with Stabaxol® added as a hydrolysis inhibitor) of hardness A90, it is possible to prepare a rubber member for downhole tools of which the 150° C. 24-hour compressive stress decrease rate is 100%. For this rubber member, when the decrease rate of 50% strain compressive stress after immersion for a prescribed time in 93° C. water relative to the 50% strain compressive stress before immersion (also called "compressive stress decrease rate at 93° C." hereinafter) was measured, it was 28% after immersion for 24 hours, 44% after immersion for 72 hours, 50% after immersion for 168 hours, and 100% after immersion for 336 hours. It was found that the test specimen after immersion for 336 hours cracked after the compressive stress test, and its shape did not recover. Furthermore, the 150° C. volume increase rate of this rubber member decreased, and it is surmised that the rubber degraded and dispersed in the water while immersed in the 150° C. water.

(12) Using ester-type thermosetting urethane rubber (without a hydrolysis inhibitor added) of hardness A90, it is possible to prepare a rubber member for downhole tools of which the 150° C. 24-hour compressive stress decrease rate is 100%. The 66° C. tensile fracture strain of this rubber member was 206%, the 66° C. compressive stress was 22 MPa, and the 66° C. compressive fracture strain was not less than 95%. Additionally, it was stable in dry environment conditions, and the 23° C. compressive stress decrease rate was 0%, 66° C. compressive stress ratio was 41, and the 150° C. 72-hour mass loss rate was 100%. Furthermore, the compressive stress decrease rate at 93° C. was 20% after immersion for 24 hours, 40% after immersion for 72 hours, 100% after immersion for 168 hours, and 100% after immersion for 336 hours. It was found that the test specimen after immersion for 168 hours and 336 hours cracked and collapsed during the compressive stress test. Furthermore, for this rubber member, the decrease rate of 50% strain compressive stress after immersion for a prescribed time in 80° C. water relative to the 50% strain compressive stress before immersion (also called "compressive stress decrease rate at 80° C." hereinafter) was 9% after immersion for 24 hours, 11% after immersion for 72 hours, 23% after immersion for 168 hours, and 49% after immersion for 336 hours. Additionally, for this rubber member, when the decrease rate of 50% strain compressive stress after immersion for a prescribed time in 66° C. water relative to the 50% strain compressive stress before immersion (also called "compressive stress decrease rate at 66° C." hereinafter) was measured, it was not greater than 5% after immersion for 24 hours. Additionally, the 150° C. volume increase rate of this rubber member decreased.

(13) Using ester-type thermosetting urethane rubber (without a hydrolysis inhibitor added) of hardness A82, it is possible to prepare a rubber member for downhole tools of which the 150° C. 24-hour compressive stress decrease rate is 100%. The 66° C. tensile fracture strain of this rubber member was 289%, the 66° C. compressive stress was 17 MPa, and the 66° C. compressive fracture strain was not less than 95%. Additionally, it was stable in dry environment conditions, and the 23° C. compressive stress decrease rate was 0%, the 66° C. compressive stress ratio was 23, and the 150° C. 72-hour mass loss rate was 100%. Furthermore, the compressive stress decrease rate at 93° C. was 8% after immersion for 24 hours, 27% after immersion for 72 hours, 100% after immersion for 168 hours, and 100% after immersion for 336 hours. It was found that the test specimen after immersion for 168 hours and 336 hours cracked and collapsed during the compressive stress test. Furthermore, the compressive stress decrease rate at 66° C. of this rubber member was not greater than 5% after immersion for 24 hours. Additionally, the 150° C. volume increase rate of this rubber member decreased.

From these results it was ascertained that a rubber member for downhole tools of which the 150° C. 24-hour compressive stress decrease rate is not less than 5%, and as desired, having prescribed mechanical characteristics, such as 150° C. 72-hour mass loss rate, 66° C. tensile fracture strain, 66° C. compressive stress, 66° C. compressive fracture strain, 66° C. compressive stress ratio, 150° C. volume increase rate, and 23° C. compressive stress decrease rate, has the characteristic of maintaining strength for a certain time and then degrading at temperatures below 150° C., that is, in various temperature environments such as 177° C., 163° C., 149° C., 121° C., 93° C., 80° C., or 66° C., as well as 25 to 40° C., including the specifically ascertained temperatures of 150° C., 121° C., 93° C., 80° C., 66° C. and 23° C. Since a rubber member for downhole tools requires a diversity of performance maintenance time and degradation time such as diverse strength according to the environment such as downhole temperature and according to the processes carried out in that environment, it was found to be possible to appropriately select a rubber member for downhole tools from the rubber members for downhole tools having a 150° C. 24-hour compressive stress decrease rate of not less than 5% of the present invention.

Other Blended Components

The rubber member for downhole tools of the present invention may be a rubber material composite which, in addition to the rubber material, particularly preferably urethane rubber, may also contain or be blended with various additives as other blended components, such as other types of rubber materials or resin materials, reinforcing materials, stabilizers, and degradation accelerators or degradation inhibitors, within a range that does not hinder the object of the present invention. In particular, by including degradable materials as other blended components, it is possible to increase and adjust as necessary the degradability and disintegrability of the rubber member for downhole tools of the present invention. For example, it is possible to cause the rubber member for downhole tools itself to lose its original strength and lose its original shape due to the degradation of the degradable material contained as another blended component in the rubber member for downhole tools. Examples of degradable materials contained as other blended components include known degradable resins such as aliphatic polyesters such as PGA, PLA, ad PGLA, and mixtures thereof. Furthermore, as the rubber member for downhole tools of the present invention, it is also possible to use a blend with another rubber material, such as nitrile rubber, polyisoprene rubber, ethylene propylene rubber, butyl rubber, styrene rubber (styrene-butadiene rubber and the like), fluorine rubber, and silicone rubber, in the range of 5 to 150 parts by mass, preferably 10 to 100 parts by mass, relative to 100 parts by mass of rubber material such as urethane rubber, polyester-based thermoplastic elastomer, or polyamide-based thermoplastic elastomer. For example, as previously described, with nitrile rubber it is normally difficult to achieve a 150° C. 24-hour compressive stress decrease rate within the prescribed range, but when a rubber member for downhole tools is obtained by using it in a blend with urethane rubber, which has a high 150° C. 24-hour compressive stress decrease rate, the rubber member for downhole tools and the downhole can be relatively easily recovered because the nitrile rubber also cannot maintain its shape due to the fact that the urethane rubber readily degrades or disintegrates.

Reinforcing Material

The rubber member for downhole tools of the present invention may also preferably contain a reinforcing material in addition to the rubber material, preferably urethane rubber. As reinforcing materials, the same materials such as resin materials conventionally used as reinforcing materials with the objective of improving mechanical strength or heat resistance as those described in regard to the mandrel 1 may be used, and the fibrous reinforcing materials or granular or powdered reinforcing materials described in regard to the mandrel 1 may be used. The reinforcing materials may be contained typically in the amount of not greater than 150 parts by mass, and preferably in the range of 10 to 100 parts by mass, relative to 100 parts by mass of the rubber material, e.g., urethane rubber, polyester-based thermoplastic elastomer, polyamide-based thermoplastic elastomer, or the like.

Shape, Size, and Structure of Circular Rubber Member

The diameter-expandable circular rubber member 2, which is the rubber member for downhole tools, is not particularly limited in its shape, size, or structure. For example, by using a circular rubber member 2 having a shape in which the cross-section in the circumferential direction orthogonal to the axial direction of the mandrel 1 has an inverted U-shape, it can expand in diameter toward the vertex of the inverted U-shape as the tip portion of the U-shape is compressed in the axial direction of the mandrel 1.

The diameter-expandable circular rubber member 2 comes into contact with the inside wall H of the downhole and the outer circumferential surface of the mandrel 1 when expanded in diameter so as to isolate (seal) the space between the plug and the downhole, and a gap is present between the plug and the downhole when the diameter-expandable circular rubber member 2 is not expanded. Therefore, the length of the diameter-expandable circular rubber member 2 in the axial direction of the mandrel 1 is preferably from 10 to 70% and more preferably from 15 to 65% relative to the length of the mandrel 1. As a result, the plug comprising the rubber member for downhole tools of the present invention has a sufficient sealing function, which yields a function of assisting to fix the downhole and the plug after sealing.

A plug may comprise a plurality of diameter-expandable circular rubber members 2, and by so doing, it can isolate (seal) the space between the plug and the downhole at a plurality of positions in the axial direction of the mandrel 1, and the function of assisting to fix the downhole and the plug can be achieved even more reliably. When the plug is provided with a plurality of diameter-expandable circular rubber members 2, the length of the diameter-expandable circular rubber members 2 in the axial direction of the mandrel 1 described above refers to the total of the lengths of the plurality of diameter-expandable circular rubber members 2 in the axial direction of the mandrel 1. When the plug is provided with a plurality of diameter-expandable circular rubber members 2, they may have the same or different materials, shapes, or structures, as long as their respective 150° C. 24-hour compressive stress decrease rates are within the prescribed range. In addition, a plurality of diameter-expandable circular rubber members 2 may be placed adjacently or at a distance from one another at positions between the pair of rings 5 and 5' to be described in detail later, or may be placed at positions between each pair of a plurality of pairs of rings 5 and 5'.

The diameter-expandable circular rubber member 2 may be a rubber member with a structure formed from a plurality of rubber members such as a laminated rubber. In addition, it may be provided with one or more grooves, convex parts, or a rough surface (corrugation) or the like at the parts making contact with the inside wall H of the downhole in order to further ensure the isolating (sealing) of the space between the plug and the downhole and the function of assisting to fix the downhole and the plug at the time of diameter expansion.

3. Rings

As illustrated in FIGS. 1A and 1B, in the plug comprising the rubber member for downhole tools of the present invention (that is, a specific example of a downhole tool), a pair of rings 5 and 5' are provided on the outer circumferential surface orthogonal to the axial direction of the mandrel so as to sandwich the diameter-expandable circular rubber member 2 in the axial direction of the mandrel, wherein the rings 5 and 5' are for expanding the diameter of the rubber member 2 in the direction orthogonal to the axial direction of the mandrel by compressing and shrinking the diameter of the diameter-expandable circular rubber member 2 in the axial direction of the mandrel 1. In the plug illustrated in FIGS. 1A and 1B, the pair of rings 5 and 5' are provided in order to apply a force in the axial direction of the mandrel 1 to the diameter-expandable circular rubber member 2 placed on the outer circumferential surface orthogonal to the axial direction of the mandrel 1, and to a combination of a slip 3 and a wedge 4 (in FIGS. 1A and 1B, the combinations of slips 3 and 3' and wedges 4 and 4') to be described later, which are placed as desired. Specifically, the pair of rings 5 and 5' are configured such that they can slide along the axial direction of the mandrel 1 on the outer circumferential surface of the mandrel 1 and such that the spacing therebetween can be changed. In addition, they are configured such that a force in the axial direction of the mandrel 1 can be applied to the diameter-expandable circular rubber member 2 and combination of the slip 3 and the wedge 4, which are placed as desired, by coming into contact directly or indirectly with the end part along the axial direction of these members.

The shape and size of each ring of the pair of rings 5 and 5' are not particularly limited as long as they fulfill the functions described above, but from the perspective of being able to effectively apply a force in the axial direction of the mandrel 1 to the combination of the slip 3 and the wedge 4, which are placed as desired, and to the diameter-expandable circular rubber member 2, the end surface of the rings on the side making contact with these components preferably has a flat shape. Each ring of the pair of rings 5 and 5' is preferably a circular ring which completely surrounds the outer circumferential surface of the mandrel 1, but it may also have breaks or deformed places in the circumferential direction. In addition, as for the shape in which the circle is separated in the circumferential direction, the circle may be formed as desired. As each of the rings of the pair of rings 5 and 5', a plurality of rings may be placed adjacently in the axial direction so as to form a wide ring (with a long length in the axial direction of the mandrel 1). Additionally, these may be considered to be rings that form the pair of rings 5 and 5' in a plug comprising the rubber member for downhole tools of the present invention, including members that contribute to effectively applying a force in the axial direction of the mandrel 1 to the combination of the slip 3 and the wedge 4, which are placed as desired, and to the diameter-expandable circular rubber member 2.

The pair of rings 5 and 5' may have the same or similar shapes or structures, or the shapes or structures may be different. For example, each ring of the pair of rings 5 and 5' may differ in outside diameter or length in the axial direction of the mandrel 1. In addition, for example, one of the rings of the pair of rings 5 and 5' may also be configured in a state in which it cannot slide relative to the mandrel 1, as desired. In this case, the other ring of the pair of rings 5 and 5' slides on the outer circumferential surface of the mandrel 1 to come into contact with the end part along the axial direction of the combination of the slip 3 and wedge 4, which are placed as desired, and the diameter-expandable circular rubber member 2. The configuration in which one of the rings of the pair of rings 5 and 5' cannot slide relative to the mandrel 1 as desired is not particularly limited, but, for example, the mandrel 1 and one ring of the pair of rings 5 and 5' may be formed integrally (in this case, the ring cannot slide relative to the mandrel 1), or a clutch structure such as a dog clutch or a fitting structure may be used (in this case, it is possible to switch between a state in which the ring can slide relative to the mandrel 1 and a state in which the ring cannot slide relative to the mandrel 1). As a plug in which the mandrel 1 and one of the rings of the pair of rings 5 and 5' are formed integrally, a plug in which these components are formed by integral molding or a plug formed by machining is provided.

Furthermore, the plug comprising the rubber member for downhole tools of the present invention may be provided with a plurality of pairs of rings 5 and 5'. In this case, they can be placed in locations between the plurality of pairs of rings of the diameter-expandable circular rubber member 2 and the combination of the slip 3 and wedge 4, which are placed as desired, each separately or in combinations.

Degradable Material

Of the pair of rings 5 and 5', preferably at least one ring is formed from a degradable material, and more preferably, both rings are formed from a degradable material. As the degradable material that forms at least one ring of the pair of rings 5 and 5', the same degradable materials as described above in regard to the mandrel 1 may be used. Therefore, the degradable material that forms at least one ring of the pair of rings 5 and 5' is more preferably a degradable resin, and even more preferably an aliphatic polyester. The degradable material may be one that also contains a reinforcing material, particularly one formed from an aliphatic polyester containing a reinforcing material.

When both of the rings of the pair of rings 5 and 5' are formed from a degradable material, the types and compositions of the resin of the degradable material may be the same or different. When one of the pair of rings 5 and 5' is formed from a degradable material, a metal such as aluminum or iron or a composite material of a reinforced resin or the like can be used as the material for forming the other ring.

4. Slips and Wedges

The plug comprising the rubber member for downhole tools of the present invention may, as desired, be further provided with at least one combination of a slip 3 and a wedge 4 placed at positions between the pair of rings 5 and 5' on the outer circumferential surface orthogonal to the axial direction of the mandrel 1. The combination of a slip 3 and a wedge 4 is itself a well-known means for fixing a plug and a downhole in a plug that is a downhole tool. That is, for example, the slip 3 formed from a metal, inorganic material, or the like is placed in slidable contact with the sloping upper surface of the wedge 4 formed from a composite material or the like, and when a force in the axial direction of the mandrel 1 is applied to the wedge 4 by the method described above (normally via the pair of rings 5 and 5'), the slip 3, as a result of sliding on the sloping upper surface of the wedge 4, moves outward in a direction orthogonal to the axial direction of the mandrel 1 so as to make contact with the inside wall H of the downhole and to fix the plug and the inside wall H of the downhole. The slip 3 may be provided with one or more grooves, convex parts, or a rough surface (corrugation) or the like at the parts making contact with the inside wall H of the downhole in order to more reliably fix the plug and the inside wall H of the downhole. In addition, the slip 3 may be divided into a prescribed number in the circumferential direction orthogonal to the axial direction of the mandrel 1, or, as illustrated in FIGS. 1A and 1B, may have notches beginning at one end along the axial direction and ending at an intermediate point in the direction of the other end without being divided into a prescribed number in advance (in this case, a force in the axial direction of the mandrel 1 is applied to the wedge 4, and the wedge 4 penetrates into the lower surfaces of the slip 3 so that the slip 3 is divided along the notches and the extended lines thereof, and each divided piece then moves outward in a direction orthogonal to the axial direction of the mandrel 1).

In the plug comprising the rubber member for downhole tools of the present invention, the combination of the slip 3 and the wedge 4 are placed at positions between the pair of rings 5 and 5' and may be placed adjacent to the diameter-expandable circular rubber member 2 so that a force in the axial direction of the mandrel 1 can be applied. As illustrated in FIGS. 1A and 1B, the plug comprising the rubber member for downhole tools of the present invention may be provided with a plurality of combinations of slips 3 and wedges 4 (that is, combinations of slips 3 and 3' and wedges 4 and 4'), and in that case, they may be placed adjacently so as to sandwich the diameter-expandable circular rubber member 2, or they may be placed at other positions. When the plug comprising the rubber member for downhole tools of the present invention is provided with a plurality of diameter-expandable circular rubber members 2, the arrangement of the combinations of slips 3 and 3' and wedges 4 and 4' can be selected appropriately as desired.

Degradable Material

When the plug comprising the rubber member for downhole tools of the present invention has a combination of a slip 3 and a wedge 4, either one or both of the slip 3 and wedge 4 may be formed from a degradable material, and furthermore, either one or both of the slip 3 and wedge 4 may be a composite material containing a reinforcing material (reinforced resin). Additionally, a metal or an inorganic material may also be incorporated into the degradable material. As the degradable material or reinforcing material, the same materials as described above in regard to the mandrel 1 may be used. In the plug comprising the rubber member for downhole tools of the present invention, any of the mandrel 1, the pair of rings 5 and 5', and the combination of the slip 3 and the wedge 4 may be formed from degradable material.

Furthermore, the plug comprising the rubber member for downhole tools of the present invention may be one in which a slip 3 and a wedge 4 are not provided on the outer circumferential surface of the mandrel 1 (not illustrated). That is, metals and composite materials were often used for conventional slips 3 and wedges 4 from the perspective of strength and the like, but due to the fact that the plug comprising the rubber member for downhole tools of the present invention comprises a mandrel 1 and a pair of rings 5 and 5' formed from a degradable material and a diameter-expandable circular rubber member 2 of which the 150° C. 24-hour compressive stress decrease rate is not less than 5% (that is, degradable or disintegrable), it is possible to provide a plug having the strength (tensile strength and the like) and isolation performance between the plug and downhole as well as excellent degradability desired for a plug that is a downhole tool. Therefore, the plug structure is simpler and degradability as a plug overall is even higher because it does not have a slip 3 and a wedge 4, in which undegradable metals or composite materials are generally used.

5. Sleeve System and Ball Sealer or Ball Seat

When the downhole tool comprising the rubber member for downhole tools of the present invention is a sleeve system, it may comprise a rubber member for downhole tools that is a ball sealer or a ball seat. Specifically, by forming either one or both of the ball sealer and the ball seat from the same degradable or disintegrable rubber material and other blended components described in detail above in regard to the diameter-expandable circular rubber member, it is possible to make a rubber member for downhole tools of which the 150° C. 24-hour compressive stress decrease rate is not less than 5%, preferably not less than 20%, and particularly preferably not less than 50%.

6. Protecting Member

The rubber member for downhole tools of the present invention can be used as a protecting member which protects the various sensors and flow paths arranged in a downhole by covering or the like, so that breakage or damage does not occur due to friction or due to contact or collision with other members, or due to the high-pressure fluid used in well treatment. The rubber member for downhole tools of the present invention has the function of protecting sensors and flow paths and the like and can be easily removed or recovered due to having a 150° C. 24-hour compressive stress decrease rate of not less than 5%, and due to having prescribed mechanical characteristics such as 150° C. 72-hour mass loss rate, 66° C. tensile fracture strain, 66° C. compressive stress, 66° C. compressive fracture strain, 66° C. compressive stress ratio, 150° C. volume increase rate, 23° C. compressive stress decrease rate, and the like.

III. Method for Manufacturing Rubber Member for Downhole Tools

The method for manufacturing the rubber member for downhole tools of the present invention is not limited as long as it can produce a rubber member for downhole tools having a 150° C. 24-hour compressive stress decrease rate of not less than 5%, and having prescribed mechanical characteristics such as 150° C. 72-hour mass loss rate, 66° C. tensile fracture strain, 66° C. compressive stress, 66° C. compressive fracture strain, 66° C. compressive stress ratio, 150° C. volume increase rate, 23° C. compressive stress decrease rate, and the like. For example, the rubber member for downhole tools may be molded directly by cast molding, compression molding, injection molding, extrusion molding, centrifugal molding, or other known molding methods for rubber materials, or it may be produced by molding a preliminary molded product of a prescribed shape (sheet, plate, or the like) and then machining the obtained preliminary molded product as necessary by cutting, perforation, or the like, or by combining it with other parts by a known method. The specific application, composition, shape, size, structure, and so forth of the rubber member for downhole tools may be selected as appropriate according to need without limitation to the diameter-expandable circular rubber member exemplified above, and an optimal manufacturing method in accordance with the rubber member for downhole tools may be employed. Furthermore, when molding is performed by knead, cast, or injection molding as the rubber member molding method, the molding processing may be performed by a single molding cycle or may be divided into a plurality of cycles. For example, when a relatively large rubber member is manufactured, by performing molding divided into a plurality of cycles, molding processing can be performed using a small-capacity injection molder, and as a result, there is the advantage that a molded product in which void generation is suppressed can be obtained. Furthermore, when molding processing is divided into a plurality of cycles, materials of a type and mechanical strength different from those of the rubber material that forms the rubber member may be used in combination, and by so doing, the deformation and degradation behaviors of the rubber member for downhole tools can be controlled.

IV. Method for Manufacturing Downhole Tool Comprising Rubber Member for Downhole Tools The method for manufacturing a downhole tool comprising the rubber member for downhole tools of the present invention is not particularly limited. For example, the method for manufacturing the plug described above as a specific example of a downhole tool is not limited as long as it is a method that can manufacture a plug comprising a rubber member for downhole tools (diameter-expandable circular rubber member), a mandrel, and a pair of rings. For example, by a known method such as cast molding, compression molding, injection molding, extrusion molding (including solidification-and-extrusion molding), or centrifugal molding, each of the members provided in the plug, such as the mandrel, rings, and, as desired, slips and wedges, is molded using the material suited to that member, and after each of the obtained members is machined such as by cutting or perforating as necessary, they are combined by known methods to produce a plug.

When the plug comprising the rubber member for downhole tools of the present invention is a plug in which a mandrel and one ring of a pair of rings are integrally formed, it is preferred that the mandrel and one ring of the pair of rings are integrally formed by integral molding by a molding method such as injection molding, extrusion molding (including solidification-and-extrusion molding), or centrifugal molding, or by machining such as cutting.

V. Method for Recovering Hydrocarbon Resource

The method for recovering a hydrocarbon resource of the present invention is a method that uses a downhole tool comprising the rubber member for downhole tools of the present invention, and the method for recovering a hydrocarbon resource of the present invention can reliably perform downhole isolation and the operations of well treatment such as fracturing, and, as necessary, can be easily removed and can easily secure a flow path, and therefore can reduce expense or shorten processes. A specific example of the method for recovering a hydrocarbon resource will be described below for the case of a plug comprising a rubber member for downhole tools.

Isolation of Downhole

Specifically, in the plug comprising the rubber member for downhole tools of the present invention, by a force being applied in the axial direction of the mandrel to the pair of rings, the force in the axial direction of the mandrel is transmitted to the diameter-expandable circular rubber member which is a rubber member for downhole tools, and as a result, the diameter-expandable circular rubber member expands in diameter in a direction orthogonal to the mandrel axial direction as it shrinks in diameter in the mandrel axial direction. The circular rubber member expands in diameter and the outward part in the direction orthogonal to the axial direction comes into contact with the inside wall H of the downhole, and additionally, the inward part in the direction orthogonal to the axial direction comes into contact with the outer circumferential surface of the mandrel, thereby isolation (sealing) the space between the plug and the downhole (downhole sealing). Then, in the state where the space between the plug and the downhole has been isolated (sealed), well treatment such as fracturing can be performed. After the well treatment such as fracturing has been completed, the diameter-expandable circular rubber member remains inside the downhole in the diameter-expanded state, and by working together with the combination of the slip and wedge provided as desired, it can fix the plug at a prescribed position of the downhole. Furthermore, when the aforementioned isolation (sealing) or downhole protection or the like is performed in a downhole which is a high-temperature environment where the rubber member for downhole tools ends up degrading in a short time, a treatment method can be employed in which the seal performance (strength and the like) and the protective function can be maintained for a desired time by controlling the ambient temperature of the rubber member for downhole tools by injecting fluid from above ground (cooldown injection).

Degradation of Plug

According to the method for recovering a hydrocarbon resource that uses a plug (downhole tool) comprising the rubber member for downhole tools of the present invention, some or all of the plug, particularly the rubber member for downhole tools, can be easily degraded and removed after well isolation treatment has been performed. Specifically, when perforation and fracturing of the prescribed sections have been completed or when well drilling have been completed and production of petroleum or natural gas or the like has begun, the rubber member for downhole tools such as a diameter-expandable circular rubber member can be easily degraded, and, by further biodegradation, hydrolysis, or chemical degradation by some other method as desired, the mandrel and pair of rings and the like can be easily degraded and removed. As a result, with the method for recovering a hydrocarbon resource of the present invention, the substantial cost and time conventionally required to remove or recover, or to destroy or fragment by milling, perforation, or another method, numerous downhole tools such as plugs remaining inside a well after the completion of the well become unnecessary, which makes it possible to reduce the expense and shorten the processes of well drilling. Furthermore, it is preferred that the rubber member for downhole tools remaining after the well treatment disappears completely by the time production is begun, but even if it does not disappear completely, as long as it is in a state that its strength decreases and it can be disintegrated by stimulation such as water flow in the downhole, the disintegrated rubber member for downhole tools can be easily recovered by flowback or the like, and since it does not cause clogging in the downhole or fractures, it does not hinder production of the petroleum, natural gas, or the like. Additionally, normally, the higher the downhole temperature, the shorter the time required for degradation and strength decrease of the rubber member for downhole tools. Furthermore, depending on the well, the moisture content in the subterranean formation is sometimes low, and in this case, degradation of the downhole tool can be accelerated by allowing the water-based fluid used during fracturing to remain in the well without recovering it after fracturing.

Sealing and Degradation in Sleeve System

According to the method for recovering a hydrocarbon resource that uses a rubber member for downhole tools that is a ball sealer or ball seat of the present invention, due to the fact that the ball sealer or ball seat (either one or both of the ball sealer and ball seat), which is degradable due to having a 150° C. 24-hour compressive stress decrease rate of not less than 5%, can be easily degraded and removed under various well environment conditions after the downhole is isolated and fracturing is performed by putting the ball sealer and ball seat in contact, the seal can be removed and flow paths assured, and also, since a process to remove the degradable ball sealer or ball seat is unnecessary, it can similarly reduce expense or shorten processes.

Furthermore, the present invention provides a method for recovering a hydrocarbon resource, the method comprising the step of using a downhole tool comprising the rubber member for downhole tools described in (1) to (16) above, wherein the rubber member for downhole tools is degraded inside a borehole after the borehole is isolated.

Additionally, the present invention provides a method for hydrocarbon resource recovery, the method comprising the step of using a downhole tool comprising the rubber member for downhole tools described in (1) to (16) above, and further comprising other members for a downhole tool containing a degradable material, preferably polyglycolic acid, wherein the rubber member for downhole tools is degraded inside a borehole after the borehole is isolated.

Additionally, the present invention provides a method for recovering a hydrocarbon resource, the method comprising the step of using the downhole tool comprising a rubber member for downhole tools described in (1) to (16) above, the downhole tool being arranged such that the rubber member for downhole tools contacts other members for downhole tools and/or covers the other members for downhole tools, wherein the rubber member for downhole tools is degraded inside a borehole after a well treatment is performed.

Also, the present invention provides a method for recovering a hydrocarbon resource wherein the above rubber member for downhole tools contains at least one selected from the group consisting of urethane rubber, natural rubber, polyisoprene, ethylene propylene rubber, butyl rubber, styrene rubber, acrylic rubber, aliphatic polyester rubber, chloroprene rubber, polyester-based thermoplastic elastomer, and polyamide-based thermoplastic elastomer, and also provides a method for recovering a hydrocarbon resource wherein the above rubber member for downhole tools has a hydrolyzable functional group.

INDUSTRIAL APPLICABILITY

The present invention has high industrial applicability because it can provide a member for a downhole tool and a downhole tool which, due to being a rubber member for downhole tools wherein the decrease rate of a 50% strain compressive stress after immersion for 24 hours in 150° C. water relative to the 50% strain compressive stress before immersion is not less than 5%, can reliably perform downhole isolation and the operations of well treatment such as fracturing, and, as necessary, can be easily removed and can easily secure a flow path under a diversity of well environment conditions due to the increasing harshness and diversity of excavation conditions such as increasing depth, and that contributes to reduced expense or shortening of processes.

Additionally, the present invention has high industrial applicability because it provides a method for recovering a hydrocarbon resource in which, due to being a method for recovering a hydrocarbon resource using the above downhole tool, can reliably perform downhole isolation and the operations of well treatment such as fracturing, and, as necessary, can be easily removed and can easily secure a flow path under a diversity of well environment conditions due to the increasing harshness and diversity of excavation conditions, and that contributes to reduced expense or shortening of processes.

REFERENCE SIGNS LIST

1 Mandrel
2 Rubber member for downhole tool (diameter-expandable circular rubber member)
3, 3' Slips
4, 4' Wedges
5, 5' Rings
10 Ball sealer
12 Ball seat
H Inside wall of downhole

The invention claimed is:

1. A downhole tool comprising:
a mandrel,
a degradable circular rubber member; and
a pair of wedges, wherein
the degradable circular rubber member and the wedges are disposed in an axial direction of the mandrel so that the degradable circular rubber is located between the wedges,
the circular rubber member is expandable in diameter in a direction orthogonal to the axial direction of the mandrel so that the circular rubber member comes into contact with an inside wall of a downhole, when the circular rubber member is compressed by the pair of the wedges,
the circular rubber member exhibits a decrease rate of a 50% strain compressive stress after immersion for 24 hours in 150° C. water relative to a 50% strain compressive stress before the immersion is not less than 5%, and
the circular rubber member comprises crosslinked-type thermoplastic polyester-based urethane rubbers.

2. The downhole tool according to claim 1, wherein the circular rubber member contains a rubber having a hydrolyzable functional group.

3. The downhole tool according to claim 1, wherein the circular rubber member is a seal member.

4. The downhole tool according to claim 1, further comprising a ball sealer or a ball seat.

5. The downhole tool according to claim 1, wherein the circular rubber member functions as a protecting member.

6. The downhole tool according to claim 1, wherein the tool is selected from a group consisting of a frac plug, a bridge plug, a packer, and a sleeve system.

* * * * *